(12) United States Patent
Soma et al.

(10) Patent No.: US 9,723,654 B2
(45) Date of Patent: *Aug. 1, 2017

(54) INFORMATION PROCESSING SYSTEM, COMMUNICATION TERMINAL, INFORMATION PROCESSING UNIT AND PROGRAM

(71) Applicant: Sony Corporation, Tokyo (JP)

(72) Inventors: Isao Soma, Saitama (JP); Naoki Miyabayashi, Tokyo (JP); Yoshihiro Yoneda, Kanagawa (JP); Seiji Kuroda, Kanagawa (JP); Yasuharu Ishikawa, Kanagawa (JP); Kazuo Takada, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,889

(22) Filed: Jun. 9, 2016

(65) Prior Publication Data
US 2016/0295639 A1    Oct. 6, 2016

Related U.S. Application Data

(63) Continuation of application No. 13/463,457, filed on May 3, 2012, now Pat. No. 9,396,477, which is a (Continued)

(30) Foreign Application Priority Data

Apr. 8, 2008 (JP) ................................. 2008-100623

(51) Int. Cl.
*H04W 88/04* (2009.01)
*G06Q 30/02* (2012.01)
(Continued)

(52) U.S. Cl.
CPC ............ *H04W 88/04* (2013.01); *G06Q 30/02* (2013.01); *H04W 4/008* (2013.01); *H04W 76/023* (2013.01); *H04W 76/06* (2013.01)

(58) Field of Classification Search
CPC ... H04W 88/04; H04W 4/008; H04W 76/023; H04W 76/06
(Continued)

(56) References Cited

U.S. PATENT DOCUMENTS

| 6,922,559 | B2 * | 7/2005 | Mohammed | .......... | H04W 12/06 455/418 |
| 6,988,146 | B1 * | 1/2006 | Magret | ................. | H04L 12/185 455/433 |

(Continued)

FOREIGN PATENT DOCUMENTS

| JP | 2002-073493 | 3/2002 |
| JP | 2002-359623 | 12/2002 |

(Continued)

OTHER PUBLICATIONS

Okuyama et al., "A Configuration Data Management Method for Wireless LAN Communication", I PSI SIG Technical Report, Mar. 4, 2001, pp. 111-118.

(Continued)

*Primary Examiner* — Hai V Nguyen
(74) *Attorney, Agent, or Firm* — K&L Gates LLP

(57) ABSTRACT

There is provided an information processing system including a service provider unit, a communication terminal and an information processing unit. The communication terminal includes a terminal first communication section, a terminal second communication section to communicate with the information processing unit through a first communication channel, a terminal third communication section to communicate with the information processing unit through a second (Continued)

communication channel, and a terminal communication control section. The information processing unit includes a unit first communication section to communicate with the communication terminal through the first communication channel, a unit second communication section to communicate with the communication terminal through the second communication channel, a unit communication control section to switch communication channels with the communication terminal from the first communication channel to the second communication channel, and a unit processing section to perform service processing with the service provider unit.

21 Claims, 7 Drawing Sheets

Related U.S. Application Data continuation of application No. 12/412,067, filed on Mar. 26, 2009, now Pat. No. 8,180,278.

(51) Int. Cl.
*H04W 4/00* (2009.01)
*H04W 76/02* (2009.01)
*H04W 76/06* (2009.01)

(58) Field of Classification Search
USPC .................................................. 455/11.1
See application file for complete search history.

(56) References Cited

U.S. PATENT DOCUMENTS

| | | | | |
|---|---|---|---|---|
| 7,139,557 B2* | 11/2006 | Tang | G06Q 30/02 370/469 |
| 7,248,834 B2* | 7/2007 | Matsuo | G06K 7/10237 348/E5.103 |
| 7,369,848 B2* | 5/2008 | Jiang | H04W 8/183 370/331 |
| 7,603,131 B2* | 10/2009 | Wang | G06Q 10/087 370/328 |
| 7,685,293 B2* | 3/2010 | Deshpande | H04L 65/1069 709/225 |
| 7,830,864 B2* | 11/2010 | Li | H04L 49/355 370/352 |
| 7,844,288 B2* | 11/2010 | Bayne | G06Q 30/02 455/412.1 |
| 7,885,644 B2* | 2/2011 | Gallagher | H04W 4/22 455/414.1 |
| 7,957,733 B2* | 6/2011 | Wang | G06Q 10/087 455/414.1 |
| 7,962,369 B2* | 6/2011 | Rosenberg | G06Q 20/20 705/26.1 |
| 8,014,720 B2* | 9/2011 | Lortz | G06F 8/61 455/41.1 |
| 8,023,968 B2* | 9/2011 | Wang | G06Q 10/087 370/328 |
| 8,073,468 B2* | 12/2011 | Wang | G06Q 10/087 370/328 |
| 8,095,154 B1* | 1/2012 | Wang | G06Q 10/087 370/328 |
| 8,135,398 B2* | 3/2012 | Wang | G06Q 10/087 455/414.1 |
| 8,180,278 B2* | 5/2012 | Soma | G06Q 30/02 370/338 |
| 8,373,582 B2* | 2/2013 | Hoffberg | G08G 1/0104 340/539.13 |
| 8,385,823 B2* | 2/2013 | Naniyat | H04W 76/02 370/469 |
| 8,478,886 B2* | 7/2013 | Deshpande | H04L 65/1069 709/219 |
| 8,483,610 B2* | 7/2013 | Lortz | G06F 8/61 455/41.1 |
| 8,483,744 B2* | 7/2013 | Takada | H04W 12/06 455/525 |
| 8,621,126 B2* | 12/2013 | Sueyoshi | H04B 5/0031 455/41.1 |
| 8,676,135 B2* | 3/2014 | Hong | G06Q 30/06 455/345 |
| 8,677,432 B2* | 3/2014 | Seo | H04H 60/80 725/109 |
| 8,687,536 B2* | 4/2014 | Michaelis | H04L 12/185 370/312 |
| 8,718,700 B2* | 5/2014 | Takada | H04W 12/06 455/517 |
| 8,756,126 B2* | 6/2014 | Choi | G06Q 10/107 705/30 |
| 8,797,855 B1* | 8/2014 | Wieland | H04W 76/025 370/230 |
| 8,805,358 B2* | 8/2014 | Wang | G06Q 10/087 455/414.1 |
| 8,909,556 B2* | 12/2014 | Huxham | H04L 63/10 705/64 |
| 9,396,477 B2* | 7/2016 | Soma | G06Q 30/02 |
| 2002/0086663 A1* | 7/2002 | Tang | G06Q 30/02 455/414.1 |
| 2004/0257317 A1* | 12/2004 | O'Keeffe | G09F 9/35 345/87 |
| 2005/0020285 A1* | 1/2005 | Kozuki | G06F 21/10 455/456.6 |
| 2005/0030917 A1* | 2/2005 | Haller | H04L 69/40 370/328 |
| 2005/0063409 A1* | 3/2005 | Oommen | H04L 12/1836 370/432 |
| 2005/0114262 A1* | 5/2005 | Howard | G06Q 20/04 705/40 |
| 2005/0138369 A1* | 6/2005 | Lebovitz | H04L 12/185 713/163 |
| 2005/0177631 A1* | 8/2005 | Bahl | H04L 41/00 709/224 |
| 2005/0239448 A1* | 10/2005 | Bayne | G06Q 30/02 455/414.3 |
| 2005/0239495 A1* | 10/2005 | Bayne | G06Q 30/02 455/550.1 |
| 2006/0029078 A1* | 2/2006 | Lu | H04L 12/185 370/395.2 |
| 2006/0034215 A1* | 2/2006 | Moon | H04L 12/189 370/328 |
| 2006/0056357 A1* | 3/2006 | Payne | H04B 7/0811 370/334 |
| 2006/0072532 A1* | 4/2006 | Dorenbosch | H04L 12/185 370/342 |
| 2006/0268902 A1* | 11/2006 | Bonner | H04L 63/102 370/401 |
| 2007/0001853 A1* | 1/2007 | Otranen | G06K 7/0008 340/572.1 |
| 2007/0101122 A1* | 5/2007 | Guo | H04L 63/061 713/153 |
| 2007/0136773 A1* | 6/2007 | O'Neil | H04N 7/17318 725/100 |
| 2007/0238448 A1* | 10/2007 | Gallagher | H04W 4/22 455/414.2 |
| 2007/0293216 A1* | 12/2007 | Jiang | H04W 4/12 455/433 |
| 2008/0062937 A1* | 3/2008 | Mansfield | H04N 21/4126 370/338 |
| 2008/0070571 A1 | 3/2008 | Nguyen et al. | |
| 2008/0107063 A1* | 5/2008 | Oleszczuk | H04W 16/10 370/315 |
| 2008/0165719 A1* | 7/2008 | Visotsky | H04B 7/2606 370/315 |
| 2008/0167002 A1* | 7/2008 | Kim | H04W 12/12 455/411 |
| 2008/0177865 A1* | 7/2008 | Heo | H04L 69/22 709/219 |
| 2008/0219227 A1* | 9/2008 | Michaelis | H04L 12/189 370/338 |

(56) References Cited

U.S. PATENT DOCUMENTS

| | | | |
|---|---|---|---|
| 2008/0219230 A1* | 9/2008 | Lee | H04L 29/12518 370/338 |
| 2008/0238610 A1* | 10/2008 | Rosenberg | G06Q 20/20 340/5.7 |
| 2008/0280624 A1* | 11/2008 | Wrappe | G01S 1/68 455/456.1 |
| 2009/0019056 A1* | 1/2009 | Othman | H04L 67/16 |
| 2009/0052348 A1* | 2/2009 | Kato | H04L 63/0492 370/254 |
| 2009/0055899 A1* | 2/2009 | Deshpande | H04L 65/1069 726/4 |
| 2009/0088219 A1* | 4/2009 | Bayne | G06Q 30/02 455/566 |
| 2009/0132682 A1* | 5/2009 | Counterman | H04L 63/08 709/220 |
| 2009/0170432 A1* | 7/2009 | Lortz | G06F 8/61 455/41.1 |
| 2009/0196258 A1* | 8/2009 | Escobar Sanz | H04W 36/0066 370/332 |
| 2009/0241163 A1* | 9/2009 | Seo | H04N 21/4305 725/139 |
| 2009/0253417 A1* | 10/2009 | Soma | G06Q 30/02 455/414.2 |
| 2006/0323645 | 12/2009 | Fukami et al. | |
| 2009/0313689 A1* | 12/2009 | Nystrom | H04W 12/06 726/9 |
| 2010/0057887 A1* | 3/2010 | Wang | G06Q 10/087 709/219 |
| 2010/0112941 A1* | 5/2010 | Bangs | H04B 5/0012 455/41.1 |
| 2011/0022755 A1* | 1/2011 | Sueyoshi | H04B 5/0031 710/109 |
| 2011/0208590 A1* | 8/2011 | Wang | G06Q 10/087 705/14.58 |
| 2011/0211113 A1* | 9/2011 | Wang | G06Q 10/087 348/441 |
| 2011/0287716 A1* | 11/2011 | Lortz | G06F 8/61 455/41.1 |
| 2012/0009944 A1* | 1/2012 | Wang | G06Q 10/087 455/456.3 |
| 2012/0123846 A1* | 5/2012 | Wang | G06Q 10/087 705/14.26 |
| 2012/0240171 A1* | 9/2012 | Wang | G06Q 10/087 725/81 |
| 2014/0071818 A1* | 3/2014 | Wang | H04W 28/06 370/230 |

FOREIGN PATENT DOCUMENTS

| | | |
|---|---|---|
| JP | 2005-064111 | 4/2005 |
| JP | 3671881 | 4/2005 |
| JP | 2006-157815 | 6/2006 |
| JP | 2007-201791 | 8/2007 |

OTHER PUBLICATIONS

Japanese Office Action issued Oct. 9, 2012 for corresponding Japanese Appln. No. 2010-141556.

Japanese Office Action issued Jan. 12, 2010, for corresponding Japanese Appln. No. 2008-100623.

* cited by examiner

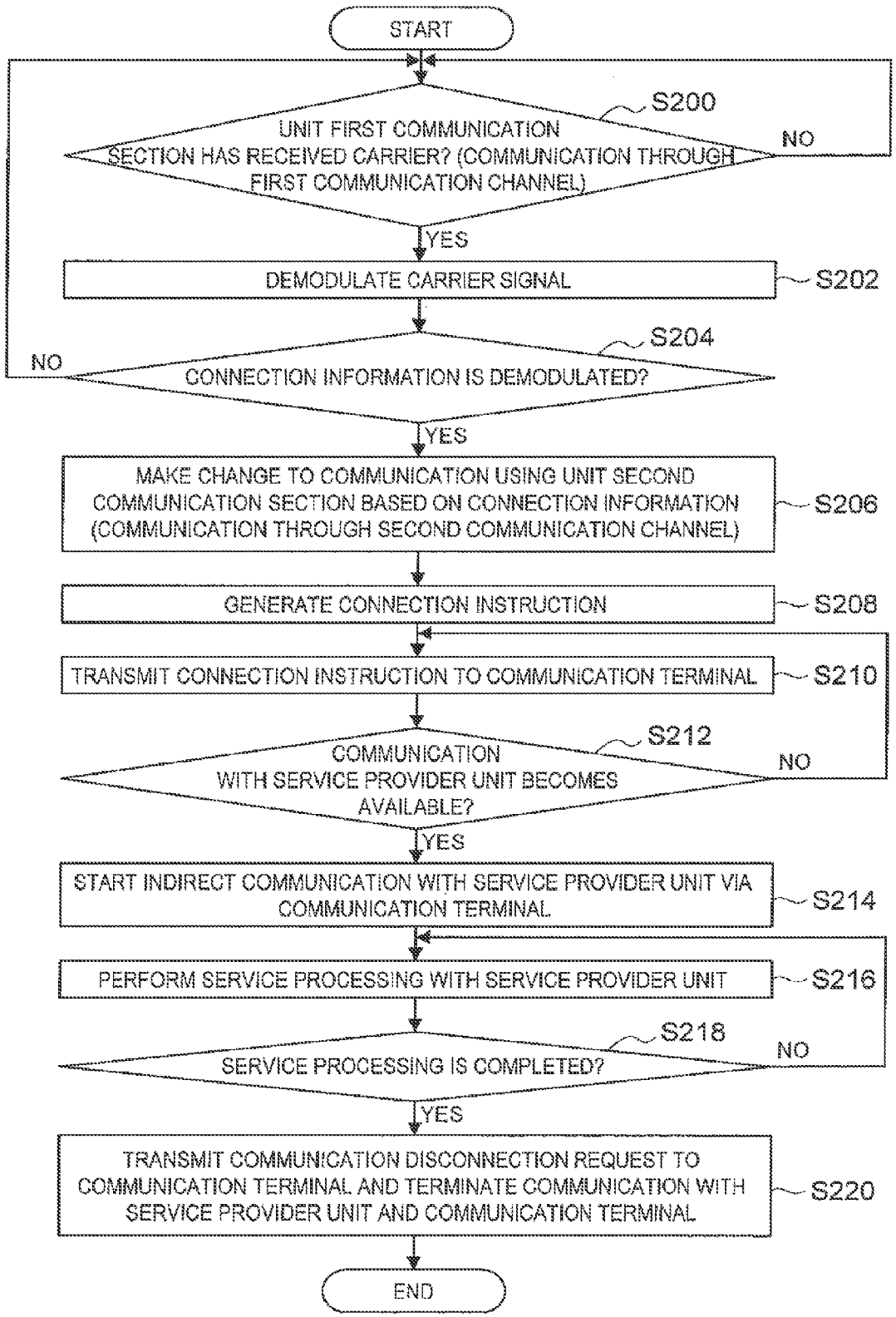

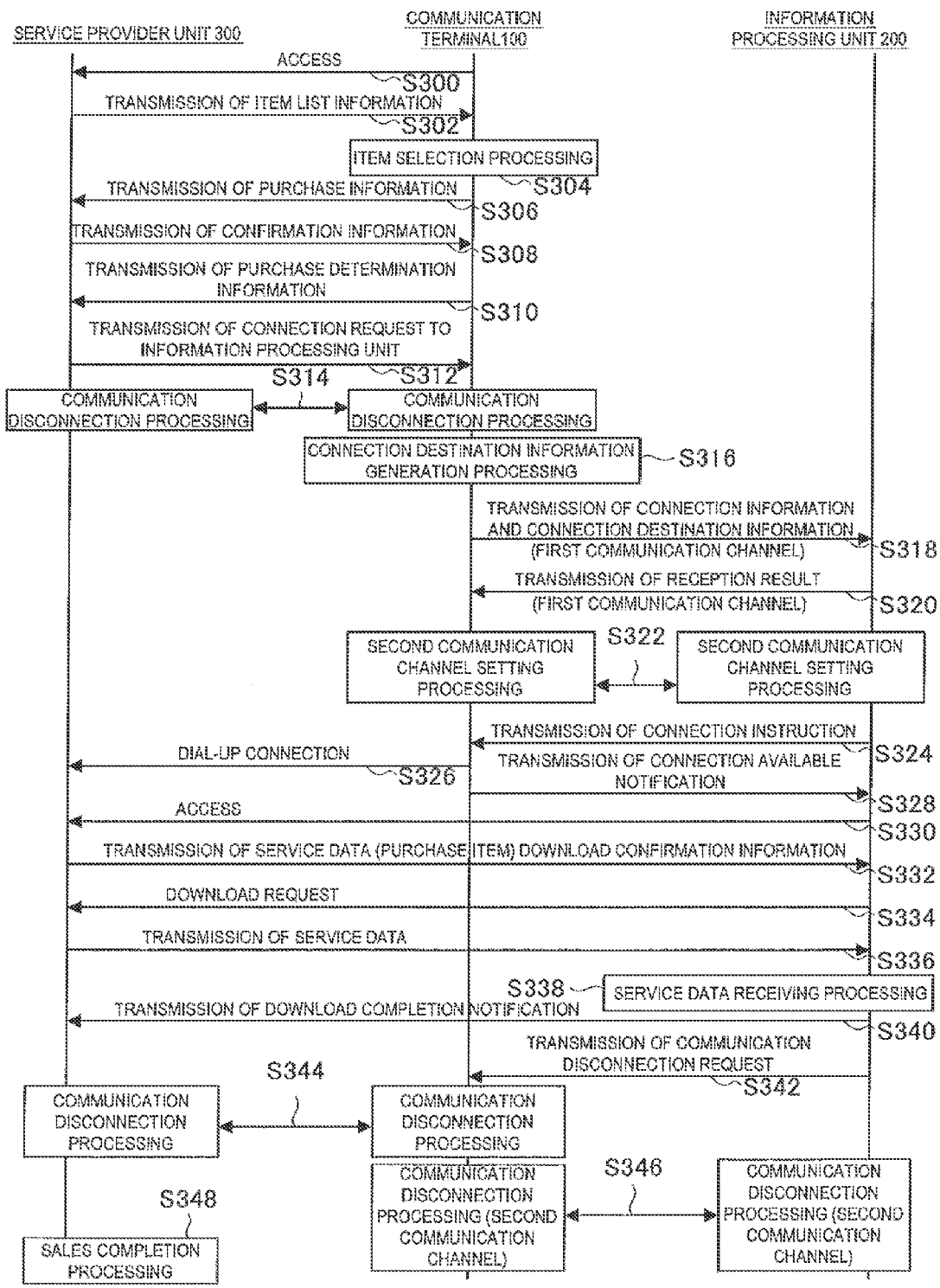

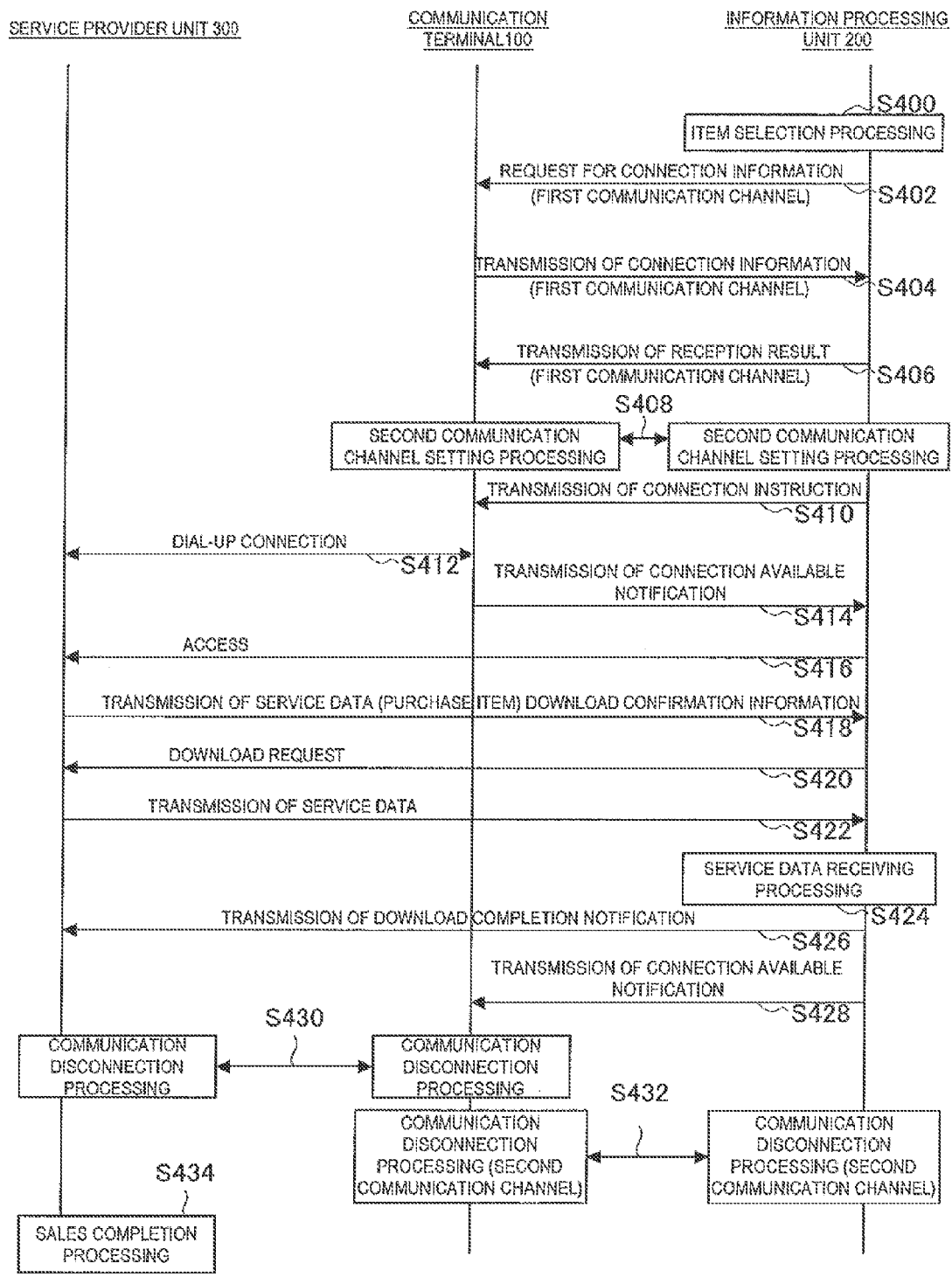

INFORMATION PROCESSING SYSTEM, COMMUNICATION TERMINAL, INFORMATION PROCESSING UNIT AND PROGRAM

CROSS REFERENCES TO RELATED APPLICATIONS

The present application is a continuation of U.S. application Ser. No. 13/463,457, filed May 3, 2012, which is a continuation of U.S. application Ser. No. 12/412,067, filed Mar. 26, 2009, which claims priority to Japanese Patent Application JP 2008-100623 filed in the Japan Patent Office on Apr. 8, 2008, the entire contents of which being incorporated herein by reference.

BACKGROUND

The present disclosure relates to an information processing system, a communication terminal, an information processing unit and a program.

Communication terminals such as mobile phones are highly sophisticated today, and a user of a communication terminal can receive various serves by making a connection to a service provider unit such as a server that provides various services via a base station or the like, for example. Further, such a communication terminal enables indirect communication between the server and an information processing unit incapable of directly communicating with the server, such as a personal computer (PC) and a car navigation unit, by making a connection to the information processing unit.

In such circumstances, techniques of establishing indirect communication between the information processing unit and the service provider unit that provides services via the communication terminal have been developed. For example, a technique that connects a PC (information processing unit) and a mobile phone unit (communication terminal) to allow access to contents designed for mobile phone units (communication terminals) from the PC (information processing unit) via the mobile phone unit (communication terminal) is disclosed in Japanese Unexamined Patent Application Publication No. 2005-94111.

Further, a technique that enables communication with a specified communication target unit by selectively switching a plurality of different communication methods is disclosed in Japanese Patent No. 3671881, for example.

A user of a hitherto known information processing unit which employs the technique according to related art that establishes indirect communication between the information processing unit and the service provider unit via the communication terminal can receive services provided by the service provider unit using the information processing unit even when the information processing unit is incapable of directly communicating with the service provider unit. In a hitherto known information processing system to which the technique according to related art that establishes indirect communication between the information processing unit and the service provider unit via the communication terminal is applied, a series of processing steps related to services are performed by the known information processing unit in order to receive the services provided by the known service provider unit in the known information processing unit.

However, services provided generally are not always such that a series of processing steps related to the services can be performed by the known information processing unit as intended by the known information processing system. For example, the unit to perform processing can change as shown in the following processing (1) to (3).

(1) First Purchase Processing <Unit to Perform Processing: Mobile Phone (Known Communication Terminal)>

A mobile phone (known communication terminal) makes a connection to a server (known service provider unit) and purchases map data.

(2) Connection Processing <Unit to Perform Processing: Mobile Phone (Known Communication Terminal)>

The mobile phone (known communication terminal) establishes a connection with a car navigation unit (known information processing unit). The mobile phone (known communication terminal) then transmits information related to the purchase processing in the processing (1) to the car navigation unit (known information processing unit).

(3) Second Purchase Processing <Unit to Perform Processing: Car Navigation Unit (Known Information Processing Unit)>

The car navigation unit (known information processing unit) makes an indirect connection to the server (known service provider unit) via the mobile phone (known communication terminal) based on the information related to the purchase processing received in the processing (2). The car navigation unit (known information processing unit) then downloads the purchased map data based on the information related to the purchase processing received in the processing (2).

In the case where the unit to perform processing changes as shown in the processing (1) to (3), it is necessary for a user to have the known communication terminal or the known information processing unit carry out each processing (1) to (3) independently. Therefore, user-friendliness decreases significantly in the known information processing system where services for which the unit to perform processing changes as shown in (1) to (3) are provided.

The known information processing system to which the technique according to the related art that establishes indirect communication between an information processing unit and a service provider unit via a communication terminal is applied is compatible with the processing of the above step (3) only. Further, even if the technique that selectively switches among a plurality of different communication methods is further applied to the known information processing unit and the known communication terminal, it only improves the user-friendliness in the processing of the above step (2).

Accordingly, even with the use of the known information processing unit and the known communication terminal, it is difficult for a user to receive services provided by the service provider unit seamlessly using the information processing unit incapable of direct communication with the service provider unit that provide services. Therefore, there has been a demand for an information processing system that enables seamless reception of services provided by a service provider unit using an information processing unit incapable of direct communication with the service provider unit that provide services and thus improves user-friendliness.

In light of the foregoing, it is desirable to provide a novel and improved information processing system, a communication terminal, an information processing unit and a program that enable seamless reception of services provided by a service provider unit using an information processing unit indirectly communicating with the service provider unit via a communication terminal.

SUMMARY

According to a first embodiment, there is provided a information processing system including at least one service provider unit to store service data related to provision of a service, a communication terminal capable of communicating with the service provider unit, and an information processing unit capable of communicating with the service provider unit via the communication terminal and performing service processing related to a service provided by the service provider unit with the service provider unit. The communication terminal includes a terminal first communication section to communicate with the service provider unit, a terminal second communication section to communicate with the information processing unit through a first communication channel using a carrier at a prescribed frequency and transmit to the information processing unit connection information for establishing a second communication channel, which is different from the first communication channel, between the communication terminal and the information processing unit, a terminal third communication section to communicate with the information processing unit through the second communication channel established based on the connection information, and a terminal communication control section to transmit the connection information via the terminal second communication section selectively according to a communication result with the service provider unit, switch communication channels with the information processing unit from the first communication channel to the second communication channel based on a reception result notification of the connection information transmitted from the information processing unit, enable communication with the service provider unit corresponding to the connection instruction via the terminal first communication section if the terminal third communication section receives a connection instruction transmitted from the information processing unit, and connect the terminal first communication section and the terminal third communication section so as to enable communication between the information processing unit and the service provider unit corresponding to the connection instruction. The information processing unit includes a unit first communication section to communicate with the communication terminal through the first communication channel, a unit second communication section to communicate with the communication terminal through the second communication channel, a unit communication control section to transmit a reception result notification in response to reception of the connection information by the unit first communication section via the unit first communication section, cause the unit second communication section to establish the second communication channel based on the connection information received by the unit first communication section, and switch communication channels with the communication terminal from the first communication channel to the second communication channel based on an establishment result of the second communication channel by the unit second communication section, and a unit processing section to transmit the connection instruction designating the service provider unit to be communicated with via the unit second communication section in response to switching of communication channels by the unit communication control section, and communicate with the service provider unit corresponding to the connection instruction via the unit second communication section and perform the service processing with the service provider unit.

In this configuration, it is possible to implement the information processing system that enables seamless reception of a service provided by the service provider unit using the information processing unit that indirectly communicates with the service provider unit via the communication terminal.

The information processing unit may further include a display section capable of displaying communication request information requesting communication through the first communication channel, and if the communication request information is displayed on the display section, the unit processing section may generate a connection information acquisition request requesting acquisition of the connection information and transmit the generated connection information acquisition request to the communication terminal via the unit first communication section.

If the terminal second communication section receives the connection information acquisition request, the terminal communication control section of the communication terminal may transmit the connection information from the terminal second communication section.

The communication terminal may further include a terminal processing section to generate connection destination information at least containing service provider unit connection information for making a connection to the service provider unit and session information for identifying a session between the communication terminal and the service provider unit, based on a communication result with the service provider unit, and the terminal processing section may transmit the connection destination information to the information processing unit via the terminal second communication section or the terminal third communication section.

If the service processing with the service provider unit is completed, the unit processing section of the information processing unit may transmit a communication disconnection request for disconnecting communication with the service provider unit to the communication terminal via the unit second communication section, and if the terminal third communication section receives the communication disconnection request, the terminal communication control section of the communication terminal may disconnect communication with the service provider unit via the terminal first communication section.

According to a second embodiment, there is provided a communication terminal including a terminal first communication section to communicate with at least one service provider unit to store service data related to provision of a service, a terminal second communication section to communicate with an information processing unit capable of performing service processing related to a service provided by the service provider unit with the service provider unit through a first communication channel using a carrier at a prescribed frequency, and transmit to the information processing unit connection information for establishing a second communication channel, which is different from the first communication channel, between the communication terminal and the information processing unit, a terminal third communication section to communicate with the information processing unit through the second communication channel established based on the connection information, and a terminal communication control section to transmit the connection information via the terminal second communication section selectively according to a communication result with the service provider unit, switch communication channels with the information processing unit from the first communication channel to the second communication channel based on a reception result notification of the connection information transmitted from the information processing unit, enable communication with the service provider unit corresponding to the connection instruction via the terminal first communication section if the terminal third communication section receives a connection instruction transmitted from the information processing unit, and connect the terminal first communication section and the terminal third communication section so as to enable communication between the information processing unit and the service provider unit corresponding to the connection instruction.

In this configuration, it is possible to implement a part of the information processing system that enables seamless reception of a service provided by the service provider unit using the information processing unit that indirectly communicates with the service provider unit via the communication terminal.

If the terminal second communication section receives a connection information acquisition request requesting acquisition of the connection information transmitted from the information processing unit, the terminal communication control section may transmit the connection information via the terminal second communication section.

According to a third embodiment, there is provided an information processing unit including a unit first communication section to communicate with a communication terminal capable of communicating with at least one service provider unit to store service data related to provision of a service through a first communication channel using a carrier at a prescribed frequency, a unit second communication section to communicate with the communication terminal through a second communication channel, which is different from the first communication channel, a unit communication control section to cause the unit second communication section to establish the second communication channel based on connection information for establishing the second communication channel, the connection information being transmitted from the communication terminal and received by the unit first communication section, and switch communication channels with the communication terminal from the first communication channel to the second communication channel based on an establishment result of the second communication channel by the unit second communication section, and a unit processing section to transmit a connection instruction designating the service provider unit to be communicated with to the communication terminal via the unit second communication section in response to switching of communication channels by the unit communication control section, and communicate with the service provider unit corresponding to the connection instruction via the unit second communication section and perform service processing related to a service provided by the service provider unit with the service provider unit based on a reception result of the connection instruction transmitted from the communication terminal.

In this configuration, it is possible to implement a part of the information processing system that enables seamless reception of a service provided by the service provider unit using the information processing unit that indirectly communicates with the service provider unit via the communication terminal.

The information processing unit may further include a display section capable of displaying communication request information requesting communication through the first communication channel, and if the communication request information is displayed on the display section, the unit processing section may generate a connection information acquisition request requesting acquisition of the connection information and transmit the generated connection information acquisition request to the communication terminal via the unit first communication section.

According to a fourth embodiment, there is provided a program causing a computer to function as first communication means to communicate with at least one service provider unit to store service data related to provision of a service, as second communication means to communicate with an information processing unit capable of performing service processing related to a service provided by the service provider unit with the service provider unit through a first communication channel using a carrier at a prescribed frequency and transmit connection information for establishing a second communication channel, which is different from the first communication channel, between the computer and the information processing unit to the information processing unit, as third communication means to communicate with the information processing unit through the second communication channel established based on the connection information, and as communication control means to transmit the connection information via the second communication means selectively according to a communication result with the service provider unit, switch communication channels with the information processing unit from the first communication channel to the second communication channel based on a reception result notification of the connection information transmitted from the information processing unit, enable communication with the service provider unit corresponding to the connection instruction via the first communication means if the third communication means receives a connection instruction transmitted from the information processing unit, and connect the first communication means and the third communication means so as to enable communication between the information processing unit and the service provider unit corresponding to the connection instruction.

With such a program, it is possible to implement the information processing system that enables seamless reception of a service provided by the service provider unit using the information processing unit that indirectly communicates with the service provider unit via the communication terminal.

According to a fifth embodiment, there is provided a program causing a computer to function as first communication means to communicate with a communication terminal capable of communicating with at least one service provider unit to store service data related to provision of a service through a first communication channel using a carrier at a prescribed frequency, as second communication means to communicate with the communication terminal through a second communication channel, which is different from the first communication channel, as communication control means to cause the second communication means to establish the second communication channel based on connection information for establishing the second communication channel, the connection information being transmitted from the communication terminal and received by the first communication means, and switch communication channels with the communication terminal from the first communication channel to the second communication channel based on an establishment result of the second communication channel by the second communication means, and a processing means to transmit a connection instruction designating the service provider unit to be communicated with to the communication terminal via the second communication means in response to switching of communication channels by the communication control means and communicate with the service provider unit corresponding to the connection instruction via the second communication means and perform service processing related to a service provided by the service provider unit with the service provider unit based on a reception result of the connection instruction transmitted from the communication terminal.

With such a program, it is possible to implement the information processing system that enables seamless reception of a service provided by the service provider unit using the information processing unit that indirectly communicates with the service provider unit via the communication terminal.

According to the embodiments described above, it is possible to seamlessly receive services provided by the service provider unit using the information processing unit indirectly communicating with the service provider unit via the communication terminal.

Additional features and advantages are described herein, and will be apparent from the following Detailed Description and the figures.

BRIEF DESCRIPTION OF THE FIGURES

FIG. 5 is a flowchart showing an example of the overview of processing in an information processing unit according to an embodiment.

FIG. 6 is a flowchart showing the process flow of a first example of processing in an information processing system according to an embodiment.

FIG. 7 is a flowchart showing the process flow of a second example of processing in an information processing system according to an embodiment.

DETAILED DESCRIPTION

Figure 1:
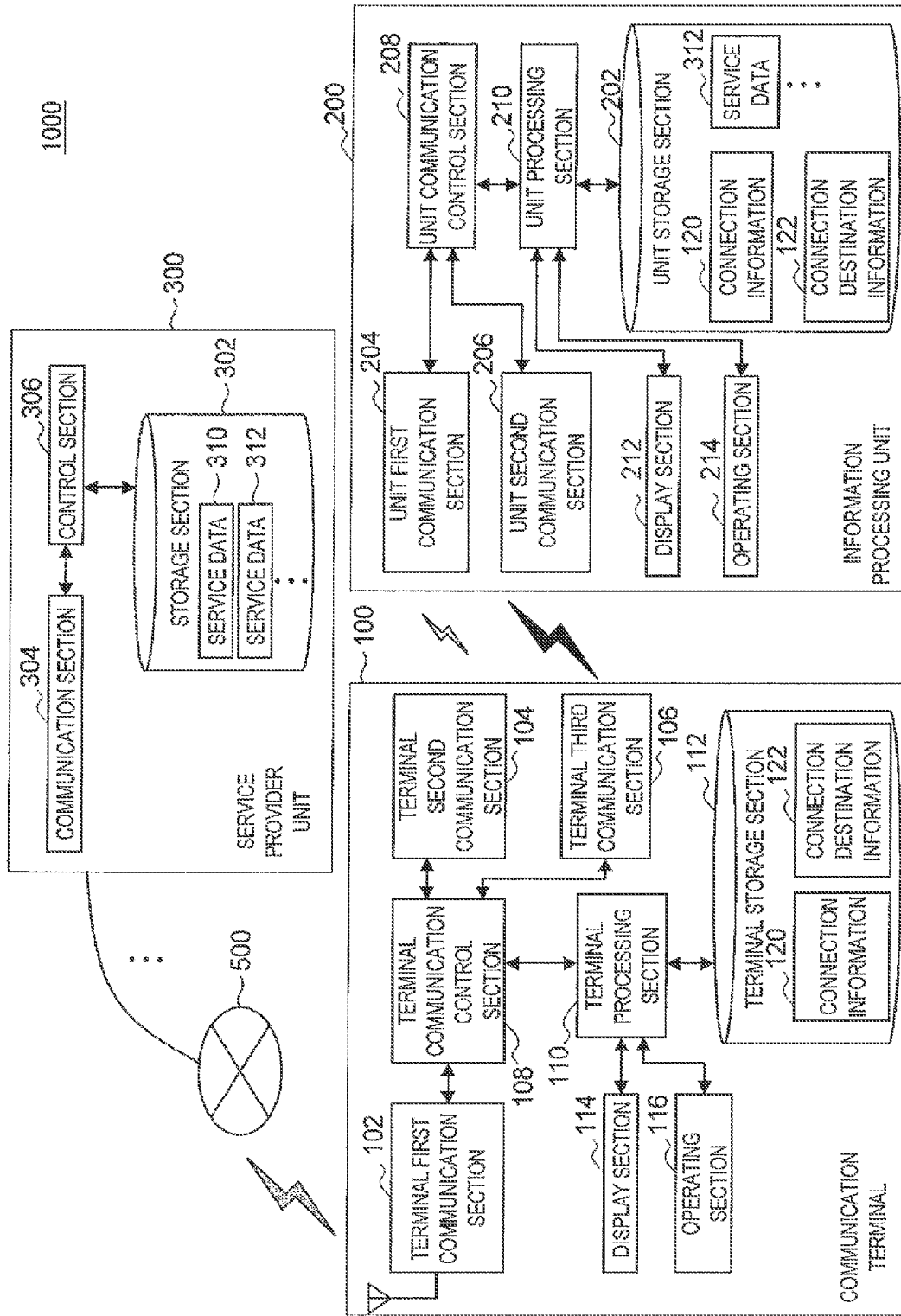
FIG. 1 is an explanatory view showing an example of the configuration of an information processing system according to an embodiment.

Hereafter, embodiments will be described in detail with reference to the appended drawings. Note that in this specification and the appended drawings, structural elements that have substantially the same functions and structures are denoted with the same reference numerals and a repeated explanation of these structural elements is omitted.
(Information Processing System According to an Embodiment)

FIG. 1 is an explanatory view showing an example of the configuration of an information processing system 1000 according to an embodiment. Referring to FIG. 1, the information processing system 1000 includes a communication terminal 100, an information processing unit 200, and at least one service provider unit 300 etc. The communication terminal 100 is connected to each of the service provider unit 300 etc. through a network 500. Although the information processing unit 200 is incapable of directly communicating with each of the service provider unit 300 etc., the information processing unit 200 can indirectly communicate with each of the service provider unit 300 etc. via the communication terminal 100 by making a connection to the communication terminal 100.

The network 500 may be a wireless wide area network (WWAN) through a base station, a wireless metropolitan area network (WMAN) or the like, though not limited thereto. Further, the term "connection" referred to in an embodiment means that communication is possible between units (or communication is established between units), for example.

Each of the communication terminal 100, the information processing unit 200 and the service provider unit 300 etc. that constitute the information processing system 1000 is described hereinafter. In the following, the service provider unit 300 among at least one service provider units is described, and the other service provider units are not described because they may have the identical configuration. Further, in the following, the case where the communication terminal 100 communicates with the service provider unit 300 and the information processing unit 200 indirectly communicates with the service provider unit 300 is described by way of illustration.
[1] Service Provider Unit 300

The service provider unit 300 is described firstly. The service provider unit 300 includes a storage section 302, a communication section 304 and a control section 306, and it acts to provide given services to a unit from which a connection is made. Examples of the given services provided by the service provider unit 300 are a download sales service of applications, a download sales service of various kinds of data such as map data, an information providing service such as advertisements and coupons and so on, though not limited thereto.

The service provider unit 300 may further include read only memory (ROM) in which programs and control data such as operation parameter to be used by the control section 306 are recorded, random access memory (RAM) to primarily store programs to be executed by the control section 306, an operating section to be manipulated by an administrator of the service provider unit 300, a display section and so on, although they are not shown. The service provider unit 300 connects the above components through a bus as a data transmission channel, for example.

The operating section (not shown) may be an operation input device such as a keyboard and a mouse, a button, a direction key, a rotary selector such as a jog dial, or a combination of those, for example, though not limited thereto. Further, the display section (not shown) may be a liquid crystal display (LCD), an organic electroluminescence (EL) display (which is also called an organic light emitting diode (OLED) display) or the like, though not limited thereto.

The storage section 302 is a storage means included in the service provider unit 300, and it may store service data related to provision of services, various applications to be used by the control section 306 or the like upon provision of services, databases in which information such as sold items, prices and customers are recorded and so on, for example. The service data stored in the storage section 302 correspond to the services provided by the service provider unit 300. For example, if the service provider unit 300 provides the download sales services, applications and data such as map data as items of the download sales services are stored as the service data in the storage section 302. Further, if the service provider unit 300 provides the information providing service, data of advertisement information and data of coupon information are stored as the service data in the storage section 302. FIG. 1 shows the case where the service data 310, 312 etc. are stored in the storage section 302.

The storage section 302 may be a magnetic recording medium such as a hard disk, nonvolatile memory such as electrically erasable programmable read-only memory (EEPROM), flash memory, magnetoresistive random access memory (MRAM), ferroelectric random access memory (FeRAM) and phase-change random access memory (PRAM) and so on, though not limited thereto.

The communication section 304 is a communication means included in the service provider unit 300, and it performs communication related to provided services with a unit such as the communication terminal 100 from which a connection is made through the network 500. The communication related to provided services performed by the communication section 304 may be transmission of service data (i.e. downloading of service data to the communication terminal 100), transmission of a request for a connection with the information processing unit 200 to the communication terminal 100 (which is referred to hereinafter also as the "first connection request") and so on, though not limited thereto. The communication section 304 may be formed by hardware including a communication interface compatible with the network 500.

The first connection request is information that acts as a trigger for start of communication with the information processing unit 200 in the communication terminal 100. For example, the first connection request may contain a connection instruction to the information processing unit 200, information of a site URL corresponding to the service provider unit 300, session information about communication with the communication terminal 100 (e.g. information identifying a session related to purchase with the communication terminal 100) and so on. The first connection request may further contain message information including a message for prompting a user of the communication terminal 100 to make a connection to the information processing unit 200. The message in the message information may be "touch", "make a connection" and so on, for example.

The control section 306 is formed by a micro processing unit (MPU) or the like, for example, and performs processing related to services provided by the service provider unit 300 (which is referred to hereinafter as "service processing") with each unit such as the communication terminal 100 or the information processing unit 200 connected to the communication section 304. The service processing performed by the control section 306 may be payment processing, transmission processing of service data (e.g. data and applications as items for sale, advertisement information, coupon information etc.), generation processing of the first connection request and so on, for example, although not limited thereto.

Having the above configuration, the service provider unit 300 can provide services to the units such as the communication terminal 100 and the information processing unit 200 with which a connection is made. Specific examples of the processing of the communication terminal 100, the information processing unit 200 and the service provider unit 300 in the information processing system 1000 are described later.

[2] Communication Terminal 100

The communication terminal 100 is described next. The communication terminal 100 is a communication unit having a communication function capable of directly communicating with the service provider unit 300 through the network 500. The communication terminal 100 further has another communication function capable of directly communicating with the information processing unit 200, thereby allowing the information processing unit 200 and the service provider unit 300 to indirectly communicate with each other.

The communication terminal 100 communicates with the information processing unit 200 using two different communication channels. Before describing the configuration of the communication terminal 100, the reason that the communication terminal 100 performs communication with the information processing unit 200 using two different communication channels is described hereinafter.

(2-1) Reason that the Communication Terminal 100 Performs Communication with the Information Processing Unit 200 Using Two Different Communication Channels In the case of performing communication between two units such as the communication terminal 100 and the information processing unit 200, a high speed and high secure communication method is generally demanded. Thus, the two units such as the communication terminal 100 and the information processing unit 200 are connected by wireless communication as defined in IEEE 802.15.1, wireless communication using a wireless local area network (LAN) defined in IEEE 802.11b or the like, wired communication using a local area network (LAN) and so on, for example. However, when connecting the two units by wired or wireless communication, it is necessary for a user to perform various connection settings such as setting of an internet protocol (IP) address and communication setting of IEEE 802.15.1 in order to enable communication. If a user is forced to perform such connection setting work for enabling communication, user-friendliness decreases significantly. Further, when a user is forced to perform such connection setting work for enabling communication, seamless communication between the information processing unit 200 and the service provider unit 300 is difficult.

In light of this, the communication terminal 100 according to an embodiment improves user-friendliness and allows seamless communication between the information processing unit 200 and the service provider unit 300 by eliminating the need for the above connection setting by a user. Specifically, the communication terminal 100 communicates with the information processing unit 200 using a first communication channel and a second communication channel through which communication is performed by different communication methods, thereby improving user-friendliness and enabling seamless communication.

The first communication channel is established by a communication method capable of performing one-to-one communication with the information processing unit 200 without the need for particular communication setting by a user. For example, the first communication channel according to an embodiment may be a communication channel established by near field communication (NFC) that uses a magnetic field (carrier) with a specific frequency such as 13.56 MHz for communication, infrared communication that uses infrared radiation for communication or the like, though not limited thereto.

On the other hand, the second communication channel is established by a communication method capable of performing one-to-one communication with the information processing unit 200 at higher speed with the need for prescribed communication setting. For example, the second communication channel according to an embodiment may be a communication channel established by wireless communication as defined in IEEE 802.15.1, wireless communication using a wireless LAN defined in IEEE 802.11b or the like, wired communication using a LAN or the like, though not limited thereto.

The communication method using the first communication channel and the second communication channel between the communication terminal 100 and the information processing unit 200 is described hereinafter in further detail. The communication terminal 100 selectively transmits various kinds of information such as connection information and connection destination information to the information processing unit 200 using the first communication channel.

The connection information is information in which setting for making the information processing unit 200 perform connection setting to establish a second communication channel is recorded. For example, the connection information may contain a personal identification number (PIN) for authentication, a private IP address assigned to the communication terminal 100, a media access control (MAC) address unique to the communication terminal 100 and so on, though not limited thereto.

The connection destination information is information that specifies a connection destination to be used for making a connection from the information processing unit 200 to the service provider unit 300. For example, the connection destination information may contain dial-up information (one example of service provider unit connection information) for making a connection to the service provider unit 300 (or the network 500), site URL information (one example of service provider unit connection information) corresponding to the service provider unit 300, session information about communication between the communication terminal 100 and the service provider unit 300 (e.g. information identifying a session related to purchase between the communication terminal 100 and the service provider unit 300) and so on, though not limited thereto. The connection destination information may be generated by the communication terminal 100 based on the first connection request received from the service provider unit 300, dial-up information for making a connection to the network 500 prestored in the communication terminal 100 and so on.

The communication terminal 100 selectively transmits the prestored connection information, the generated connection destination information and so on to the information processing unit 200 based on a communication result with the service provider unit 300, a connection information acquisition request (which is described later) transmitted from the information processing unit 200 through the first communication channel and so on, for example.

As a result that the communication terminal 100 selectively transmits the connection information through the first communication channel, connection setting for establishing the second communication channel is performed in the information processing unit 200. Thus, it is not necessary for a user of the communication terminal 100 and the information processing unit 200 to perform connection setting for establishing the second communication channel. Therefore, the communication terminal 100 enables improvement in user-friendliness by performing communication with the information processing unit 200 using the two different communication channels. As described above, the first communication channel according to an embodiment can serve as an information transmission channel for transmitting and receiving various kinds of information such as the connection information between the communication terminal 100 and the information processing unit 200.

Further, if the communication terminal 100 receives a connection information reception result notification notifying reception of the connection information from the information processing unit 200 through the first communication channel, the communication terminal 100 switches the communication channel with the information processing unit 200 from the first communication channel to the second communication channel based on the connection information. Because connection setting for establishing the second communication channel is performed in the information processing unit 200 on the basis of the connection information transmitted through the first communication channel, the communication terminal 100 and the information processing unit 200 can communicate with each other through the second communication channel based on the connection information. Further, by the connection information transmitted from the communication terminal 100 through the first communication channel, the information processing unit 200 becomes able to make a connection to the service provider unit 300.

Communication through the second communication channel can be performed at higher speed and with higher security, for example, compared with communication through the first communication channel, and a communication distance of the second communication channel can be set longer than that of the first communication channel. Accordingly, in the state where the communication terminal 100 and the information processing unit 200 are connected through the second communication channel, the information processing unit 200 can perform indirect communication with the service provider unit 300 via the communication terminal 100 more stably. Therefore, in the information processing system 1000, the second communication channel is used as a communication channel between the information processing unit 200 and the service provider unit 300, for example. Thus, the second communication channel according to an embodiment can serve as a data transmission channel for transmitting and receiving data such as service data transmitted from the service provider unit 300 between the communication terminal 100 and the information processing unit 200.

As described above, as a result that the communication terminal 100 selectively transmits the connection information through the first communication channel, the communication terminal 100 and the information processing unit 200 can communicate with each other using the second communication channel serving as the data transmission channel without the need for connection setting by a user. Therefore, in the configuration where the communication terminal 100 performs communication with the information processing unit 200 using the two different communication channels, the communication terminal 100 allows the information processing unit 200 and the service provider unit 300 to be connected seamlessly.

As described in the foregoing, the reason that the communication terminal 100 performs communication with the information processing unit 200 using the two different communication channels is that it is possible to improve user-friendliness and enable seamless communication between the information processing unit 200 and the service provider unit 300.

(2-2) Exemplary Configuration of the Communication Terminal 100

The configuration of the communication terminal 100 is described hereinafter. The communication terminal 100 includes a terminal first communication section 102, a terminal second communication section 104, a terminal third communication section 106, a terminal communication control section 108, a terminal processing section 110, a terminal storage section 112, a display section 114, and an operating section 116.

The communication terminal 100 may further include a control section formed by an MPU or the like and capable of controlling the communication terminal 100 as a whole, ROM in which programs and control data such as operation parameters to be used by the control section are recorded, RAM to primarily store programs to be executed by the control section and so on, although they are not shown. The communication terminal 100 connects the above components through a bus as a data transmission channel, for example. Further, the control section may function as the terminal communication control section 108 and the terminal processing section 110.

[Exemplary Hardware Configuration of the Communication Terminal 100]

Figure 2:
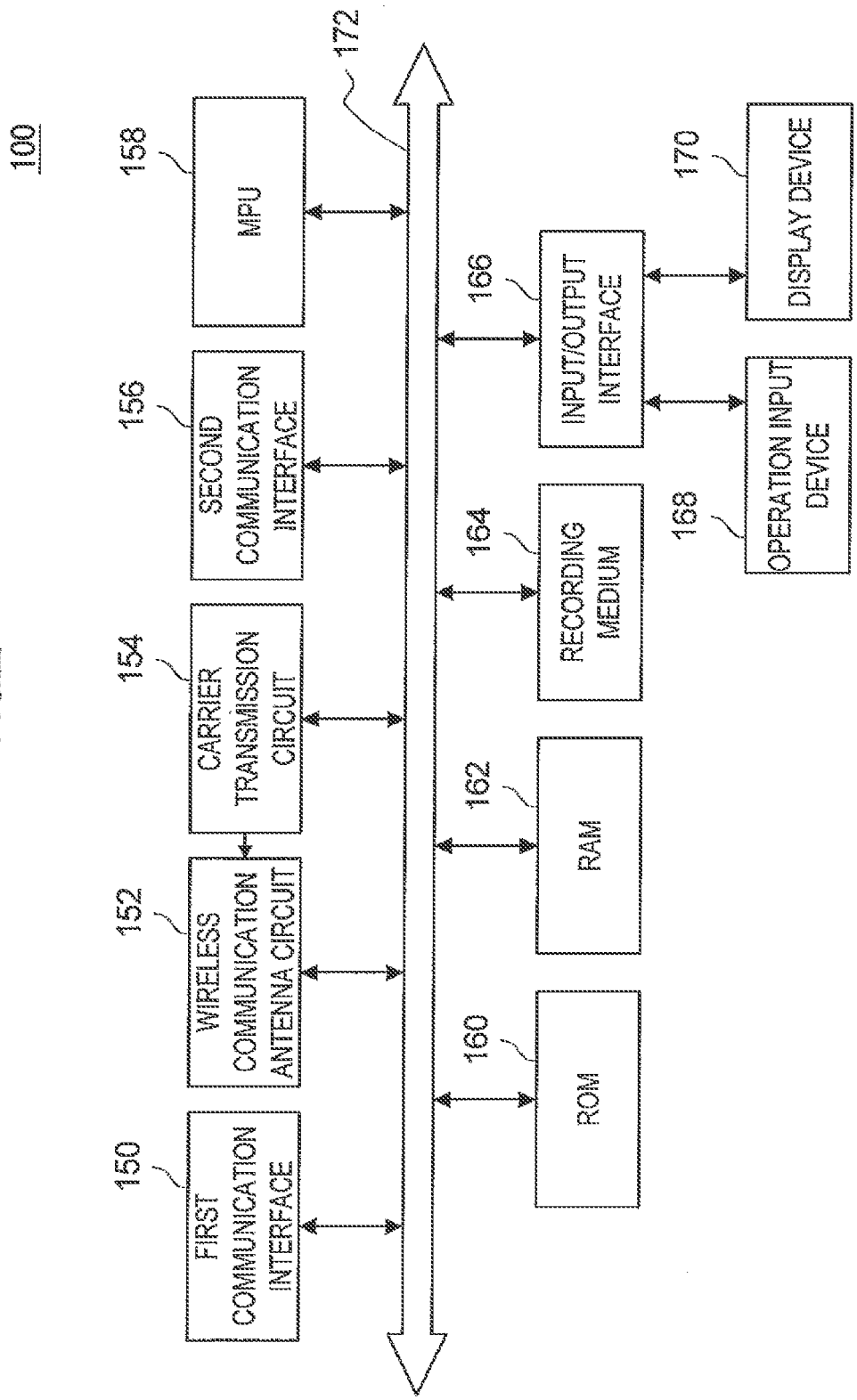
FIG. 2 is an explanatory view showing an example of the hardware configuration of a communication terminal according to an embodiment.

FIG. 2 is an explanatory view showing an example of the hardware configuration of the communication terminal 100 according to an embodiment. Referring to FIG. 2, the communication terminal 100 includes a first communication interface 150, a wireless communication antenna circuit 152, a carrier transmission circuit 154, a second communication interface 156, an MPU 158, a ROM 160, a RAM 162, a recording medium 164, an input/output interface 166, an operation input device 168 and a display device 170, for example. The communication terminal 100 connects the above components through a bus 172 as a data transmission channel, for example.

The first communication interface 150 is a first communication means included in the communication terminal 100, and it functions as the terminal first communication section 102. The first communication interface 150 acts to perform wireless communication (or wired communication) with external units such as the service provider unit 300 etc. through the network 500. For example, the first communication interface 150 may be a radio frequency (RF) circuit or the like, although not limited thereto.

The wireless communication antenna circuit 152 is a second communication means included in the communication terminal 100. The wireless communication antenna circuit 152 includes a resonant circuit composed of a coil having given inductance as a transmitting/receiving antenna and a capacitor having given capacitance and a demodulator circuit, for example. The wireless communication antenna circuit 152 receives a magnetic field with a frequency of 13.56 MHz, for example (which is referred to hereinafter as the "first carrier") and thereby demodulates various instructions such as a connection information acquisition request (which is described later) that requests the connection information transmitted from the information processing unit 200.

The carrier transmission circuit 154 includes a modulator circuit that performs amplitude shift keying (ASK) modulation and an amplifier circuit that amplifies an output of the modulator circuit, for example, and transmits the first carrier on which a carrier signal is superimposed through the transmitting/receiving antenna of the wireless communication antenna circuit 152. With the carrier transmission circuit 154, the communication terminal 100 incorporates the reader/writer function. The carrier signal transmitted from the carrier transmission circuit 154 through the wireless communication antenna circuit 152 may be signals of the connection information, the connection destination information and so on, for example. The transmission of the carrier from the carrier transmission circuit 154 is controlled by the MPU 158, for example.

Thus, the wireless communication antenna circuit 152 and the carrier transmission circuit 154 function as the terminal second communication section 104 that establishes the first communication channel in the communication terminal 100. Although FIG. 2 shows the case where the first communication channel is formed by NFC, it is not limited thereto. For example, in the case where the first communication channel is formed by infrared communication, the communication terminal 100 may include an infrared communication port, a transmitting/receiving circuit and so on.

The second communication interface 156 is a third communication means included in the communication terminal 100, and it functions as the terminal third communication section 106. The second communication interface 156 functions as a communication interface that establishes the second communication channel in the communication terminal 100. The second communication interface 156 may be an IEEE 802.15.1 port and a transmitting/receiving circuit, an IEEE 802.11b port and a transmitting/receiving circuit, a LAN terminal and a transmitting/receiving circuit or the like, though not limited thereto.

The MPU 158 functions as a control unit that controls the communication terminal 100 as a whole. Further, the MPU 158 can act as the terminal communication control section 108 and the terminal processing section 110 in the communication terminal 100.

The ROM 160 stores programs and control data such as operation parameters to be used by the MPU 158, and the RAM 162 primarily stores programs to be executed by the MPU 158 and so on.

The recording medium 164 functions as the terminal storage section 112, and it can store connection information, connection destination information, applications and so on. For example, the recording medium 164 may be a magnetic recording medium such as a hard disk, nonvolatile memory such as flash memory or the like, though not limited thereto.

The input/output interface 166 makes a connection with the operation input device 168 and the display device 170, for example. The input/output interface 166 may be a universal serial bus (USB) terminal, a digital visual interface (DVI) terminal, a high-definition multimedia interface (HDMI) terminal or the like, though not limited thereto. Further, the operation input device 168 may be a button, a direction key, a rotary selector such as a jog dial or a combination of those, for example, and it is mounted on the communication terminal 100 and connected to the input/output interface 166 inside the communication terminal 100. The display device 170 may be an LCD or an organic EL display, for example, and it is mounted on the communication terminal 100 and connected to the input/output interface 166 inside the communication terminal 100. The input/output interface 166 may also makes a connection with an operation input device (e.g. a keyboard, a mouse) or a display device (e.g. an external display) as external units of the communication terminal 100.

With the hardware configuration as shown in FIG. 2, the communication terminal 100 can form a part of the information processing system 1000 in which the service provided by the service provider unit 300 can be received seamlessly using the information processing unit 200 that indirectly communicates with the service provider unit 300 via the communication terminal 100.

Referring back to FIG. 1, the components of the communication terminal 100 that constitutes the information processing system 1000 are described hereinbelow. The terminal first communication section 102 is a first communication means included in the communication terminal 100, and it acts to perform wireless communication (or wired communication) with external units such as the service provider unit 300 etc. through the network 500. The terminal first communication section 102 may be an RF circuit or the like, for example.

The terminal second communication section 104 is a second communication means included in the communication terminal 100, and it acts to perform communication with the information processing unit 200 through the first communication channel. The terminal second communication section 104 may communicate with the information processing unit 200 by NFC or infrared communication, for example, although not limited thereto.

With the terminal second communication section 104, the communication terminal 100 can transmit various kinds of information such as connection information and connection destination information to the information processing unit 200 through the first communication channel, for example. As a result that the communication terminal 100 transmits the connection information, the communication terminal 100 and the information processing unit 200 become able to communicate with each other using the second communication channel. Thus, the communication terminal 100 may transmit the connection destination information to the information processing unit 200 through the second communication channel.

The terminal third communication section 106 is a third communication means included in the communication terminal 100, and it acts to perform communication with the information processing unit 200 through the second communication channel. The terminal third communication section 106 may communicate with the information processing unit 200 by wireless communication as defined in IEEE 802.15.1 or wireless communication using a wireless LAN as defined in IEEE 802.11b or the like, for example, though not limited thereto.

With the terminal third communication section 106, the communication terminal 100 can perform communication with the information processing unit 200 at higher speed and with higher security, for example.

The terminal communication control section 108 acts to control each of the terminal first communication section 102, the terminal second communication section 104 and the terminal third communication section 106. Specifically, the terminal communication control section 108 performs the following processing (A) to (F), for example:

(A) Perform Communication with the Service Provider Unit 300 Via the Terminal First Communication Section 102

(B) Perform communication with the information processing unit 200 via the terminal second communication section 104 (Communication through the first communication channel. Transmission of connection information, for example)

(C) Switch communication via the terminal second communication section 104 and communication via the terminal third communication section 106 (Switching of the first communication channel and the second communication channel)

(D) Perform communication with the information processing unit 200 via the terminal third communication section 106 (Communication through the second communication channel)

(E) Connect the terminal third communication section 106 and the terminal first communication section 102 and relay communication between the information processing unit 200 and the service provider unit 300 (Enable communication between the information processing unit 200 and the service provider unit 300)

(F) Disconnect communication with the service provider unit 300 and communication with the information processing unit 200 when the terminal third communication section 106 receives a communication disconnection request (which is described later) from the information processing unit 200

The terminal communication control section 108 can perform the above processing (A) to (F) based on instructions supplied from the terminal processing section 110, instructions transmitted from the information processing unit 200 (for example, an connection instruction, a connection information acquisition request, a communication disconnection request and so on, which are described later) and so on, for example.

The terminal processing section 110 acts to perform various kinds of processing in the communication terminal 100. Further, the terminal processing section 110 can function as a control section that controls the communication terminal 100 as a whole. Examples of the processing performed by the terminal processing section 110 are service processing performed with the service provider unit 300 via the terminal first communication section 102, generation processing of connection destination information, generation and transmission processing of various instructions to the terminal communication control section 108 and so on, though not limited thereto.

Examples of the service processing performed by the terminal processing section 110 are processing for section of an item to purchase, processing for determination of purchase of the item and so on. Further, the terminal processing section 110 generates the connection destination information at least including the service provider unit connection information for making a connection to the service provider unit 300 and session information identifying a session between the communication terminal 100 and the service provider unit 300 based on the first connection request transmitted from the service provider unit 300. The service provider unit connection information may be dial-up information for making a connection to the service provider unit 300 (or the network 500), site URL information corresponding to the service provider unit 300 and so on, for example, although not limited thereto.

The terminal storage section 112 is a storage means included in the communication terminal 100. In the terminal storage section 112, the connection information, the connection destination information generated by the terminal processing section 110, applications to be executed by the terminal processing section 110 and so on are stored. The connection information may be generated by the terminal processing section 110 based on an operation input to the operating section 116 and recorded into the terminal storage section 112, for example. FIG. 1 shows the case where the connection information 120 and the connection destination information 122 are stored in the terminal storage section 112.

The terminal storage section 112 may be a magnetic recording medium such as a hard disk, nonvolatile memory such as flash memory and so on, for example, though not limited thereto.

The display section 114 is a display means included in the communication terminal 100, and it displays various kinds of information on a display screen. Examples of the information displayed on the display screen of the display section 114 are an operating screen for causing the communication terminal 100 to perform a desired operation, a browsing screen, a display screen of a message based on the first connection request transmitted from the service provider unit 300 and so on, though not limited thereto. The display section 114 may be an LCD or an organic EL display, for example, though not limited thereto.

The operating section 116 is an operating means included in the communication terminal 100, and it allows a desired operation by a user to be performed. The operating section 116 enables selection of an item provided by the service provider unit 300, determination of purchase of an item and so on in the communication terminal 100 and also allows a desired operation by a user to be performed in the communication terminal 100. The operating section 116 may be an operation input device such as a keyboard and a mouse, a button, a direction key, a rotary selector such as a jog dial or a combination of those, for example, though not limited thereto.

Having the above configuration, the communication terminal 100 enables the information processing unit 200 which is incapable of directly communicating with the service provider unit 300 to indirectly communicate with the service provider unit 300. Further, the communication terminal 100 enables the information processing unit 200 to seamlessly perform service processing with the service provider unit 300 (to seamlessly receive the service provided by the service provider unit 300). The overview of the processing performed in the communication terminal 100 is described hereinafter in detail.

(2-3) Overview of Processing in the Communication Terminal 100

Figure 3:
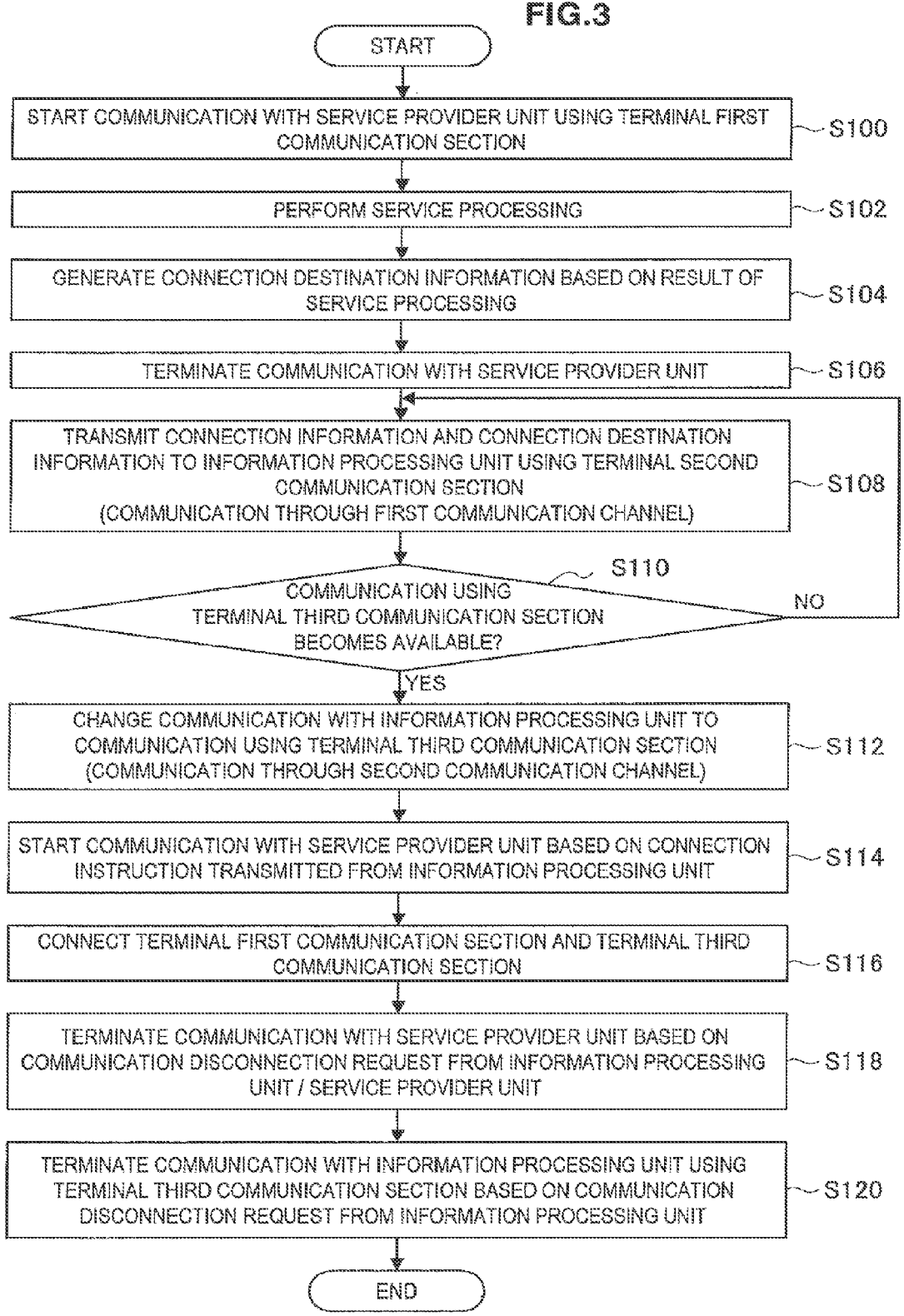
FIG. 3 is a flowchart showing an example of the overview of processing in a communication terminal according to an embodiment.

FIG. 3 is a flowchart showing an example of the overview of processing in the communication terminal 100 according to an embodiment.

The communication terminal 100 starts communication with the service provider unit 300 using the terminal first communication section 102 (S100) and performs service processing (S102). The service processing performed by the communication terminal 100 may be processing related to selection of an item to purchase, determination of purchase of an item and so on, for example, though not limited thereto.

The communication terminal 100 generates connection destination information based on a result of the service processing with the service provider unit 300 (S104). In this step, the communication terminal 100 may generate the connection destination information at least including service provider unit connection information and session information based on the first connection request transmitted from the service provider unit 300, for example. Then, the communication terminal 100 terminates communication with the service provider unit 300 (S106).

Further, the communication terminal 100 may display a message for prompting a user to make a connection to the information processing unit 200 on the display section 114 based on message information contained in the first connection request transmitted from the service provider unit 300. The message displayed on the display section 114 by the communication terminal 100 may be a message such as "touch" that prompts a user to move the communication terminal 100 to a communication range where communication with the information processing unit 200 using the communication terminal 100 is available, for example, though not limited thereto.

Although FIG. 3 shows the case where the communication terminal 100 performs the processing of the step S106 after the processing of the step S104, it is not limited thereto. For example, the communication terminal 100 may perform the processing of the step S104 after the processing of the step S106.

After communication with the service provider unit 300 is terminated in the step S106, the communication terminal 100 transmits the connection information and the connection destination information to the information processing unit 200 using the terminal second communication section 104 (S108; communication through the first communication channel). The communication terminal 100 may perform the processing of the step S108 by transmitting the first carrier on which a carrier signal is superimposed through the transmitting/receiving antenna of the wireless communication antenna circuit 152, for example, though not limited thereto.

Although FIG. 3 shows the case where the communication terminal 100 transmits the connection destination information generated by the processing of the step S104 in the step S108, it is not limited thereto. For example, the communication terminal 100 may transmit the connection destination information to the information processing unit 200 through the second communication channel after communication through the second communication channel (communicating using the terminal third communication section 106) becomes available between the communication terminal 100 and the information processing unit 200.

After transmitting the connection information and the connection destination information in the step S108, the communication terminal 100 determines whether communication using the terminal third communication section 106 (communication through the second communication channel) becomes available (S110). For example, the communication terminal 100 may determine that the communication has become available when the terminal second communication section 104 receives a connection information reception result notification that is transmitted from the information processing unit 200 upon reception of the connection instruction, though not limited thereto.

If it is not determined in the step S110 that communication through the second communication channel becomes available, the communication terminal 100 repeats the processing from the step S108. In the case where it is not determined that communication through the second communication channel becomes available even after predetermined time elapses from the processing of the step S108 or after the processing of the step S108 is repeated a predetermined number of times, the communication terminal 100 may terminate the processing (which is called time out). Further, in this case, the communication terminal 100 may make a connection to the service provider unit 300 again using the terminal first communication section 102 and give a notification that the processing in response to the first connection request (a connection request to the information processing unit 200) has failed. Alternatively, the communication terminal 100 may display a warning message on the display section 114.

On the other hand, if it is determined in the step S110 that communication through the second communication channel becomes available, the communication terminal 100 changes communication with the information processing unit 200 into communication using the terminal third communication section 106 (S112; communication through the second communication channel).

Then, based on a connection instruction transmitted from the information processing unit 200 through the second communication channel, the communication terminal 100 starts communication with the service provider unit 300 corresponding to the connection instruction using the terminal first communication section 102 (S114).

After a connection with the service provider unit 300 is established in the step S114, the communication terminal 100 connects the terminal first communication section 102 to communicate with the service provider unit 300 and the terminal third communication section 106 to communicate with the information processing unit 200 (S116). By performing the processing of the step S116, the communication terminal 100 enables the information processing unit 200 to perform indirect communication with the service provider unit 300 via the communication terminal 100.

Then, the communication terminal 100 terminates communication with the service provider unit 300 using the terminal first communication section 102 in response to a communication disconnection request transmitted from the information processing unit 200 (or the service provider unit 300) (S118).

Further, the communication terminal 100 terminates communication with the information processing unit 200 using the terminal third communication section 106 in response to a communication disconnection request transmitted from the information processing unit 200 (S120).

By performing the processing as shown in FIG. 3, the communication terminal 100 enables the information processing unit 200 which is incapable of directly communicating with the service provider unit 300 to indirectly communicate with the service provider unit 300.

Further, although the communication terminal 100 actively performs the processing from the step S100 to S112, it performs the processing from the step S114 to S120 passively in response to the instructions from the information processing unit 200. Thus, after switching communication with the information processing unit 200 into communication through the second communication channel (the processing after the step S114), the communication terminal 100 acts as a communication relay that relays communication between the information processing unit 200 and the service provider unit 300.

The switching of the active processing and the passive processing in the communication terminal 100 is performed automatically in conjunction with the switching of the communication channels with the information processing unit 200 in the step S112. Therefore, it is not necessary for a user of the communication terminal 100 to be conscious of the switching of the communication channels and the switching of the processing at all. Thus, the user can seamlessly receive the service provided by the service provider unit 300 using the information processing unit 200 that indirectly communicates with the service provider unit 300 via the communication terminal 100.

As described above, the communication terminal 100 can form a part of the information processing system 1000 in which the service provided by the service provider unit 300 can be received seamlessly using the information processing unit 200 that indirectly communicates with the service provider unit 300 via the communication terminal 100.

[3] Information Processing Unit 200

The information processing unit 200, which is another component of the information processing system 1000, is described below. The information processing unit 200 is a unit that does not have a communication function for directly communicating with the service provider unit 300 through the network 500. Further, the information processing unit 200 has two different communication functions for directly communicating with the communication terminal 100. The reason that the information processing unit 200 performs communication with the communication terminal 100 using two different communication channels is the same as the one described in the above (2-1) and thus not repeatedly described.

Having the communication functions that enable direct communication with the communication terminal 100, the information processing unit 200 can indirectly communicate with the service provider unit 300 via the communication terminal 100. In the following, the configuration of the information processing unit 200 is described with reference back to FIG. 1, and the overview of the processing performed in the information processing unit 200 is described after that.

(3-1) Exemplary Configuration of the Information Processing Unit 200

The information processing unit 200 includes a unit storage section 202, a unit first communication section 204, a unit second communication section 206, a unit communication control section 208, a unit processing section 210, a display section 212 and an operating section 214.

The information processing unit 200 may further include a control section formed by an MPU or the like and capable of controlling the information processing unit 200 as a whole, ROM in which programs and control data such as operation parameters to be used by the control section are recorded, RAM to primarily store programs to be executed by the control section and so on, although they are not shown. The information processing unit 200 connects the above components through a bus as a data transmission channel, for example. Further, the control section may function as the unit communication control section 208 and the unit processing section 210.

[Exemplary Hardware Configuration of the Information Processing Unit 200]

Figure 4:
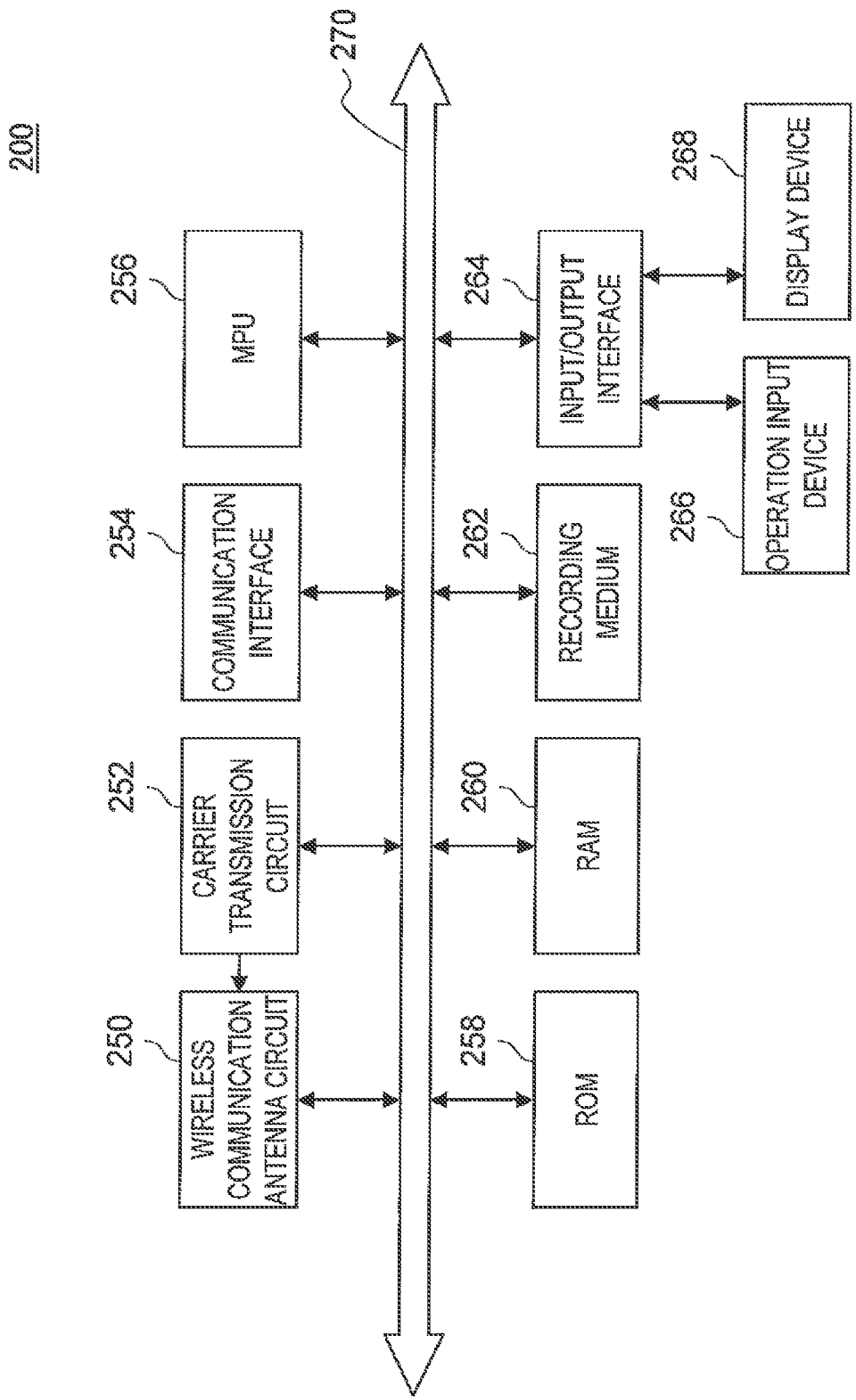
FIG. 4 is an explanatory view showing an example of the hardware configuration of an information processing unit according to an embodiment.

FIG. 4 is an explanatory view showing an example of the hardware configuration of the information processing unit 200 according to an embodiment. Referring to FIG. 4, the information processing unit 200 includes a wireless communication antenna circuit 250, a carrier transmission circuit 252, a communication interface 254, an MPU 256, a ROM 258, a RAM 260, a recording medium 262, an input/output interface 264, an operation input device 266 and a display device 268. The information processing unit 200 connects the above components through a bus 270 as a data transmission channel, for example.

The wireless communication antenna circuit 250 is a first communication means included in the information processing unit 200, and it acts to establish first communication with the communication terminal 100. The wireless communication antenna circuit 250 includes a resonant circuit composed of a coil having given inductance as a transmitting/receiving antenna and a capacitor having given capacitance and a demodulator circuit, for example, just like the wireless communication antenna circuit 152 included in the communication terminal 100 shown in FIG. 2. In this configuration, the wireless communication antenna circuit 250 can demodulate the first carrier transmitted from the communication terminal 100 and acquire various kinds of information such as the connection information and the connection destination information.

The carrier transmission circuit 252 includes a modulator circuit that performs ASK modulation and an amplifier circuit that amplifies an output of the modulator circuit, for example, and transmits the first carrier on which a carrier signal is superimposed through the transmitting/receiving antenna of the wireless communication antenna circuit 250, just like the carrier transmission circuit 154 included in the communication terminal 100 shown in FIG. 2. With the carrier transmission circuit 252, the information processing unit 200 incorporates the reader/writer function. The carrier signal transmitted from the carrier transmission circuit 252 through the wireless communication antenna circuit 250 may be signals of a connection information reception result in response to reception of connection information, a connection instruction that instructs the communication terminal 100 to make a connection to the service provider unit 300 and so on, for example. Further, the transmission of the carrier from the carrier transmission circuit 252 is controlled by the MPU 256, for example.

Thus, the wireless communication antenna circuit 250 and the carrier transmission circuit 252 function as the unit first communication section 204 that establishes the first communication channel in the information processing unit 200. Although FIG. 4 shows the case where the first communication channel is formed by NFC, it is not limited thereto. For example, in the case where the first communication channel is formed by infrared communication, the information processing unit 200 may include an infrared communication port, a transmitting/receiving circuit and so on. Thus, the unit first communication section 204 in the information processing unit 200 may have the configuration corresponding to the configuration of the terminal second communication section 104 in the communication terminal 100.

The communication interface 254 is a second communication means included in the information processing unit 200. The communication interface 254 acts to establish second communication with the communication terminal 100, and it functions as the unit second communication section 206. Thus, the communication interface 254 may have the configuration corresponding to the configuration of the terminal third communication section 106 (which corresponds to the second communication interface 156 shown in FIG. 2) in the communication terminal 100.

The MPU 256 functions as a control unit that controls the information processing unit 200 as a whole. Further, the MPU 256 can act as the unit communication control section 208 and the unit processing section 210 in the information processing unit 200.

The ROM 258 stores programs and control data such as operation parameters to be used by the MPU 256, and the RAM 260 primarily stores programs to be executed by the MPU 256 and so on.

The recording medium 262 functions as the unit storage section 202, and it can store the connection information and the connection destination information transmitted from the communication terminal 100, the service data and applications acquired from the service provider unit 300 and so on. The recording medium 262 may be a magnetic recording medium such as a hard disk, nonvolatile memory such as flash memory or the like, for example, though not limited thereto.

The input/output interface 264 makes a connection with the operation input device 266 and the display device 268, for example. The input/output interface 264 may be a USB terminal, a DVI terminal, an HDMI terminal or the like, for example, though not limited thereto. Further, the operation input device 266 may be a button, a direction key, a rotary selector such as a jog dial or a combination of those, for example, and it is mounted on the information processing unit 200 and connected to the input/output interface 264 inside the information processing unit 200. The display device 268 may be an LCD or an organic EL display, for example, and it is mounted on the information processing unit 200 and connected to the input/output interface 264 inside the information processing unit 200. The input/output interface 264 may also make a connection an operation input device (e.g. a keyboard, a mouse) or a display device (e.g. an external display) as external units of the information processing unit 200.

With the hardware configuration as shown in FIG. 4, the information processing unit 200 can indirectly communicate with the service provider unit 300 via the communication terminal 100 and perform service processing with the service provider unit 300. Further, in the communication terminal 100, the switching of the communication channels with the information processing unit 200 and the switching of the active and passive processing are performed during a series of processing steps related to communication with the service provider unit 300 or the information processing unit 200 without the need for a switching operation by a user. Thus, the information processing unit 200 can form a part of the information processing system 1000 in which the service provided by the service provider unit 300 can be received seamlessly using the information processing unit 200 that indirectly communicates with the service provider unit 300 via the communication terminal 100.

Referring back to FIG. 1, the components of the information processing unit 200 that constitutes the information processing system 1000 are described hereinbelow. The unit storage section 202 is a storage means included in the information processing unit 200. In the unit storage section 202, the connection information and the connection destination information transmitted from the communication terminal 100, the service data acquired from the service provider unit 300, applications to be executed by the unit processing section 210 and so on are stored. FIG. 1 shows the case where the connection information 120, the connection destination information 122 and the service data 312 etc. are stored in the unit storage section 202.

The unit storage section 202 may be a magnetic recording medium such as a hard disk, nonvolatile memory such as flash memory and so on, for example, though not limited thereto.

The unit first communication section 204 is a first communication means included in the information processing unit 200, and it acts to perform communication with the communication terminal 100 through the first communication channel. The unit first communication section 204 may communicate with the communication terminal 100 by NFC or infrared communication, for example, although not limited thereto.

With the unit first communication section 204, the information processing unit 200 can acquire various kinds of information such as the connection information and the connection destination information transmitted from the communication terminal 100 through the first communication channel, for example. As a result that the communication terminal 100 transmits the connection information, the communication terminal 100 and the information processing unit 200 become able to communicate with each other through the second communication channel. Thus, the information processing unit 200 may acquire the connection destination information from the communication terminal 100 through the second communication channel.

The unit second communication section 206 is a second communication means included in the information processing unit 200, and it acts to perform communication with the communication terminal 100 through the second communication channel. The unit second communication section 206 may communicate with the communication terminal 100 by wireless communication as defined in IEEE 802.15.1 or wireless communication using a wireless LAN as defined in IEEE 802.11b or the like, for example, though not limited thereto.

With the unit second communication section 206, the information processing unit 200 can perform communication with the communication terminal 100 at higher speed and with higher security, for example.

The unit communication control section 208 acts to control each of the unit first communication section 204 and the unit second communication section 206. Specifically, the unit communication control section 208 performs the following processing (a) to (e), for example:

(a) Perform communication with the communication terminal 100 via the unit first communication section 204 (Communication through the first communication channel)

(b) Transmit a "connection information reception result" indicating reception of connection information to the communication terminal 100 upon reception of the connection information by the unit first communication section 204

(c) Perform communication setting of the unit second communication section 206 based on the connection information received by the unit first communication section 204 (Formation of the second communication channel)

(d) Switch communication via the unit first communication section 204 and communication via the unit second communication section 206 (Switching of the first communication channel and the second communication channel)

(e) Perform communication with the communication terminal 100 via the unit second communication section 206 (Communication through the second communication channel)

The unit processing section 210 acts to perform various kinds of processing in the information processing unit 200. Further, the unit processing section 210 can function as a control section that controls the information processing unit 200 as a whole. Examples of the processing performed by the unit processing section 210 are generation processing of various requests to be transmitted to the communication terminal 100, service processing performed with the service provider unit 300 via the unit second communication section 206 and the communication terminal 100 and so on, though not limited thereto.

The requests generated by the unit processing section 210 may be a connection instruction based on the connection destination information acquired from the communication terminal 100, a connection information acquisition request, a communication disconnection request and so on, for example. The connection information acquisition request is information containing an instruction that requests the communication terminal 100 to transmit connection information. The communication disconnection request is information containing an instruction that requests the communication terminal 100 to disconnect communication (communication with the service provider unit 300 or communication with the information processing unit 200).

The unit processing section 210 transmits the generated connection instruction and communication disconnection request to the communication terminal 100 using the unit second communication section 206 (i.e. through the second communication channel), for example, The connection information acquisition request is a request for the connection information for establishing the second communication channel to the communication terminal 100. Thus, the unit processing section 210 transmits the generated connection information acquisition request to the communication terminal 100 using the unit first communication section 204 (i.e. through the first communication channel). The unit processing section 210 may further add dial-up information for making a connection to the service provider unit 300 (or the network 500) or the like to the connection instruction, for example.

Examples of the service processing performed by the unit processing section 210 are service data download request processing, service data download processing, service data download completion notification transmission processing and so on, though not limited thereto.

The display section 212 is a display means included in the information processing unit 200, and it displays various kinds of information on a display screen. Examples of the information displayed on the display screen of the display section 212 are an operating screen for causing the information processing unit 200 to perform a desired operation, a browsing screen, a screen showing a result of service processing, a display screen displaying communication request information and so on, though not limited thereto. The communication request information is information that requests communication with the communication terminal 100 through the first communication channel. The communication request information may be a message such as "touch" that prompts a user to move the communication terminal 100 to a communication range where communication with the information processing unit 200 through the first communication channel is available, for example, though not limited thereto. The display section 212 may be an LCD or an organic EL display, for example, though not limited thereto.

The operating section 214 is an operating means included in the information processing unit 200, and it allows a desired operation by a user to be performed. The operating section 214 enables an operation to determine purchase of an item provided by the service provider unit 300 and so on in the communication terminal 100 and also allows a desired operation by a user to be performed by the information processing unit 200. The operating section 214 may be an operation input device such as a keyboard and a mouse, a button, a direction key, a rotary selector such as a jog dial or a combination of those, for example, though not limited thereto.

Having the above configuration, the information processing unit 200 indirectly communicates with the service provider unit 300 via the communication terminal 100. The information processing unit 200 can thereby receive the service provided by the service provider unit 300. The overview of the processing performed in the information processing unit 200 is described hereinafter in further detail.

(3-2) Overview of Processing in the Information Processing Unit 200

FIG. 5 is a flowchart showing an example of the overview of the processing in the information processing unit 200 according to an embodiment. The case where the first communication channel between the communication terminal 100 and the information processing unit 200 is formed by NFC is described hereinafter by way of illustration.

The information processing unit 200 determines whether the unit first communication section 204 has received the carrier (first carrier) (S200, communication through the first communication channel). For example, the information processing unit 200 may perform determination of the step S200 based on a change in the voltage of the communication antenna of the wireless communication antenna circuit 250, though not limited thereto. If it is not determined in the step S200 that the unit first communication section 204 has received the carrier (first carrier), the information processing unit 200 does not proceed to the next step.

On the other hand, if it is determined in the step S200 that the unit first communication section 204 has received the carrier (first carrier), the information processing unit 200 demodulates the carrier signal (S202). The information processing unit 200 may perform determination of the step S200 with use of a result of the step S202. In this case, the step S200 and the step S202 can be regarded as one processing.

After demodulating the carrier signal in the step S202, the information processing unit 200 determines whether the connection information transmitted from the communication terminal 100 is demodulated (S204). If it is not determined in the step S204 that the connection information is demodulated, the information processing unit 200 repeats the processing from the step S200.

On the other hand, if it is determined in the step S204 that the connection information is demodulated, the information processing unit 200 performs communication setting of the unit second communication section 206 based on the connection information and makes change to communication using the unit second communication section 206 (S206; communication through the second communication channel).

After switching the communication channel to the second communication channel in the step S206, the information processing unit 200 generates a connection instruction that instructs the communication terminal 100 to make a connection to the service provider unit 300 (S208).

After generating the connection instruction in the step S208, the information processing unit 200 transmits the connection instruction to the communication terminal 100 through the second communication channel (S210).

After transmitting the connection instruction in the step S210, the information processing unit 200 determines whether communication with the service provider unit 300 becomes available (S212). The information processing unit 200 may perform determination of the step S212 based on whether it has received a connection result indicating that communication with the service provider unit 300 becomes available which is transmitted from the communication terminal 100, for example, though not limited thereto.

If it is not determined in the step S212 that communication with the service provider unit 300 becomes available, the information processing unit 200 repeats the processing from the step S210, for example.

On the other hand, if it is determined in the step S212 that communication with the service provider unit 300 becomes available, the information processing unit 200 starts indirect communication with the service provider unit 300 via the communication terminal 100 (S214). The information processing unit 200 may access a Web site corresponding to the service provider unit 300 based on site URL information or the like contained in the connection destination information transmitted from the communication terminal 100, for example.

Although the information processing unit 200 may acquire the connection destination information together with the connection information through the first communication channel, it is not limited thereto. For example, the information processing unit 200 may acquire the connection destination information from the communication terminal 100 through the second communication channel after the step S206.

After starting indirect communication with the service provider unit 300 via the communication terminal 100 in the step S214, the information processing unit 200 performs service processing with the service provider unit 300 (S216), and then determines whether the service processing is completed (S218). The information processing unit 200 may perform determination of the step S218 based on whether reception of the service data transmitted from the service provider unit 300 is completed, for example, through limited thereto.

If it is not determined in the step S218 that the service processing is completed, the information processing unit 200 repeats the processing from the step S216, for example.

On the other hand, if it is determined in the step S218 that the service processing is completed, the information processing unit 200 transmits a communication disconnection request to the communication terminal 100 and thereby terminates communication with the service provider unit 300 and the communication terminal 100 (S220).

By performing the processing as shown in FIG. 5, the information processing unit 200 can indirectly communicate with the service provider unit 300 via the communication terminal 100.

Further, the information processing unit 200 establishes the second communication channel based on the connection information transmitted from the communication terminal 100 and switches communication with the communication terminal 100 from the first communication channel to the second communication channel. After the communication channel is switched, the information processing unit 200 transmits the connection instruction to the service provider unit 300 based on the connection destination information acquired from the communication terminal 100 to the communication terminal 100. As described above, the communication terminal 100 makes a connection to the service provider unit 300 based on the received connection instruction and acts as a communication relay that relays communication between the information processing unit 200 and the service provider unit 300.

The switching of the communication channels with the communication terminal 100 is performed automatically based on the connection information. Further, the generation of the connection instruction is also performed automatically in conjunction with the switching of the communication channels with the communication terminal 100 in the step S206. Therefore, it is not necessary for a user of the information processing unit 200 to be conscious of the switching of the communication channels and the generation of the connection instruction at all. Thus, the user can seamlessly receive the service provided by the service provider unit 300 using the information processing unit 200 that indirectly communicates with the service provider unit 300 via the communication terminal 100.

As described above, the information processing unit 200 can form a part of the information processing system 1000 in which the service provided by the service provider unit 300 can be received seamlessly using the information processing unit 200 that indirectly communicates with the service provider unit 300 via the communication terminal 100.

[Process Flow of the Entire Information Processing System 1000]

Each of the communication terminal 100, the information processing unit 200 and the service provider unit 300 that constitute the information processing system 1000 is described in the foregoing. In the following, the process flow of the entire information processing system 1000 is described. The case where the service provider unit 300 provides a service data download sales service is described hereinafter by way of illustration.

(4-1) First Example

FIG. 6 is a flowchart showing the process flow of a first example of the processing in the information processing system 1000 according to an embodiment.

The communication terminal 100 makes a connection to the service provider unit 300 and accesses a Web site corresponding to the service provider unit 300 (S300). Then, the service provider unit 300 transmits item list information to the communication terminal 100 (S302).

Based on the item list information transmitted in the step S302, the communication terminal 100 performs item selection processing that selects an item to purchase (S304). The communication terminal 100 may perform the processing of the step S304 based on an operation input to the operating section 116.

The communication terminal 100 transmits purchase information based on a result of the item selection processing in the step S304 to the service provider unit 300 (S306). The purchase information may contain an item ID for identifying a selected item, information about the number of items to purchase and so on, for example.

Receiving the purchase information transmitted in the step S306, the service provider unit 300 transmits confirmation information in which transaction information is recorded to the communication terminal 100 (S308).

Receiving the confirmation information transmitted in the step S308, the communication terminal 100 transmits purchase determination information to the service provider unit 300 when it intends to determine the purchase of the item (S310).

Receiving the purchase determination information transmitted in the step S310, the service provider unit 300 transmits a first connection request to the communication terminal 100 (S312). The first connection request may contain a connection instruction to the information processing unit 200, site URL information corresponding to the service provider unit 300, session information related to communication with the communication terminal 100, message information containing a message prompting a user of the communication terminal 100 to make a connection to the information processing unit 200 and so on, for example.

Receiving the first connection request in the step S312, the communication terminal 100 disconnects communication with the service provider unit 300 (S314). Alternatively, the service provider unit 300 may disconnect communication with the communication terminal 100 after the processing of the step S312.

Then, the communication terminal 100 generates connection destination information based on the first connection request received in the step S312 (S316). Further, the communication terminal 100 may display a message such as "touch" that prompts a user to make a connection to the information processing unit 200 on the display section 114 based on the message information contained in the first connection request, though not limited thereto. Alternatively, the communication terminal 100 may inform a user of the above message by voice based on the message information contained in the first connection request, for example.

After generating the connection destination information in the step S316, the communication terminal 100 transmits the connection information stored in the terminal storage section 112 and the connection destination information to the information processing unit 200 using the terminal second communication section 104 (S318; communication through the first communication channel).

Although FIG. 6 shows the case where the communication terminal 100 transmits the connection destination information in the step S318, it is not limited thereto. For example, the communication terminal 100 may transmit the connection destination information between the steps S322 and S324, which are described later, through the second communication channel.

Receiving the connection information and the connection destination information transmitted in the step S318, the information processing unit 200 transmits a connection information reception result indicating reception of the connection information to the communication terminal 100 (S320; communication through the first communication channel).

The information processing unit 200 that has transmitted the connection information reception result and the communication terminal 100 that has received the connection information reception result in the step S320 respectively perform communication setting for the second communication channel. Then, the communication terminal 100 and the information processing unit 200 switch communication channels from the first communication channel to the second communication channel (S322). Although not shown in FIG. 6, communication between the communication terminal 100 and the information processing unit 200 in the processing after the step S322 is performed through the second communication channel.

After switching the communication channels in the step S322, the information processing unit 200 transmits a connection instruction for a connection with the service provider unit 300 to the communication terminal 100 (S324).

Receiving the connection instruction transmitted in the step S324, the communication terminal 100 performs dial-up connection in response to the connection instruction, thereby enabling communication with the service provider unit 300 (S326). After communication with the service provider unit 300 becomes available, the communication terminal 100 transmits a connection available notification to the information processing unit 200 (S328). Further, the communication terminal 100 connects the terminal first communication section 102 and the terminal third communication section 106, thereby enabling indirect communication between the information processing unit 200 and the service provider unit 300.

Receiving the connection available notification transmitted in the step S328, the information processing unit 200 makes an indirect connection to the service provider unit 300 via the communication terminal 100 and accesses the Web site corresponding to the service provider unit 300 (S330). The information processing unit 200 may access the Web site corresponding to the service provider unit 300 based on the site URL information contained in the connection destination information acquired from the communication terminal 100. Further, the information processing unit 200 may transfer the session information contained in the connection destination information acquired from the communication terminal 100 to the service provider unit 300, thereby taking over the sessions in the processing from the step S300 to S314.

Based on the transferred session information, the service provider unit 300, which is connected to the information processing unit 200 in the step S330, transmits download confirmation information that confirms downloading of service data (purchase item) to the information processing unit 200 via the communication terminal 100 (S332).

Receiving the download confirmation information transmitted in the step S332, the information processing unit 200 transmits a download request that requests downloading of the service data to the service provider unit 300 via the communication terminal 100 when it intends to download the service data (S334).

Receiving the download request transmitted in the step S334, the service provider unit 300 transmits the service data to the information processing unit 200 via the communication terminal 100 (S336). The data transmitted from the service provider unit 300 in the step S336 is not limited to the service data corresponding to the purchased item. For example, the service provider unit 300 may additionally transmit catalog data, advertisement information, security patch and so on.

Receiving the service data transmitted in the step S336, the information processing unit 200 performs receiving processing for the received service data (S338). Examples of the receiving processing performed by the information processing unit 200 are recording of the service data to the unit storage section 202, installation of the service data, display of information on the display screen of the display section 212 and so on, though not limited thereto.

After the service data receiving processing is completed in the step S338, the information processing unit 200 transmits a download completion notification notifying completion of service data downloading to the service provider unit 300 via the communication terminal 100 (S340). The processing of the information processing unit 200 during the steps S324 to S340 is the service processing.

Then, the information processing unit 200 transmits a communication disconnection request for disconnecting communication with the service provider unit 300 and a communication disconnection request for disconnecting communication through the second communication channel to the communication terminal 100 (S342).

Receiving the communication disconnection requests in the step S342, the communication terminal 100 disconnects communication with the service provider unit 300 (S444) and further disconnects communication through the second communication channel (S346). The service provider unit 300, which has been disconnected from the communication terminal 100 in the step S344, then performs sales completion processing as postprocessing of sales (S348). Although the disconnection of communication through the second communication channel is performed by the communication terminal 100 in the above example, it may be performed by the information processing unit 200.

As shown in FIG. 6, in the first example of the processing in the information processing system 1000 according to an embodiment, roughly three sequences of processing, (I) processing between the communication terminal 100 and the service provider unit 300, (II) processing between the communication terminal 100 and the information processing unit 200 and (III) processing between the information processing unit 200 and the service provider unit 300, are performed independently.

The communication terminal 100 can perform switching of communication channels with the information processing unit 200 and switching between active processing and passive processing automatically during communication with the information processing unit 200 as described earlier. Further, the information processing unit 200 can perform switching of communication channels with the communication terminal 100 and generation of a connection instruction automatically during communication with the communication terminal 100. Because the information processing system 1000 includes the communication terminal 100 and the information processing unit 200 having such functions, it is possible to make the processing sequences (I) to (III) appear as successive processing for a user.

Therefore, a user of the information processing system 1000 can seamlessly receive the download sales service provided by the service provider unit 300 using the information processing unit 200 incapable of direct communication with the service provider unit 300.

(4-2) Second Example

An example of the processing in the information processing system 1000 in the case where a download sales service is provided by the service provider unit 300 is described above with reference to FIG. 6. However, the process flow of the processing in the information processing system 1000 in the case where a download sales service is provided is not limited to the first example shown in FIG. 6. As a second example of the processing in the information processing system 1000, the processing in the case where content data to which use limitation or function limitation is set are prestored in the unit storage section 202 of the information processing unit 200 and then the function limitation or the like is removed is described hereinafter.

The content data prestored in the information processing unit 200 may be applications to which trial period limitation or function limitation is set, video data to which playback limitation is set, audio data to which playback limitation is set and so on, though not limited thereto. Further, the content data may be protected by an encryption key, for example. In the following, the content data prestored in the information processing unit 200 is basically referred to as service data. Further, it is assumed in the following description that the connection destination information of the service provider unit corresponding to each service data is prestored in the unit storage section 202 of the information processing unit 200.

FIG. 7 is a flowchart showing the process flow of the second example of the processing in the information processing system 1000 according to an embodiment.

The information processing unit 200 selects an item to purchase based on the service data (item) prestored in the unit storage section 202 of the information processing unit 200 (S400). The information processing unit 200 may perform the processing of the step S400 based on an operation input to the operating section 214, for example.

After selecting the item, the information processing unit 200 may display a message (communication request information) that prompts a user to make a connection to the communication terminal 100, such as "touch the communication terminal 100" on the display section 212, though not limited thereto. Alternatively, the information processing unit 200 may inform a user of the above message by voice, for example.

After selecting the item in the step S400, the information processing unit 200 transmits a connection information acquisition request that requests acquisition of connection information to the communication terminal 100 using the unit first communication section 204 (S402; communication through the first communication channel).

Receiving the connection information acquisition request transmitted in the step S400, the communication terminal 100 transmits connection information to the information processing unit 200 using the terminal second communication section 104 in response to the connection information acquisition request (S404; communication through the first communication channel).

Receiving the connection information transmitted in the step S404, the information processing unit 200 transmits a connection information reception result indicating reception of the connection information to the communication terminal 100, as in the step S320 of FIG. 6 (S406; communication through the first communication channel).

The information processing unit 200 that has transmitted the connection information reception result and the communication terminal 100 that has received the connection information reception result in the step S406 respectively perform communication setting for the second communication channel, as in the step S322 of FIG. 6. Then, the communication terminal 100 and the information processing unit 200 switch communication channels from the first communication channel to the second communication channel (S408).

After switching the communication channels in the step S408, the information processing unit 200 transmits a connection instruction for a connection with the service provider unit 300 to the communication terminal 100, as in the step S324 of FIG. 6 (S410).

Receiving the connection instruction transmitted in the step S410, the communication terminal 100 performs dial-up connection in response to the connection instruction, thereby enabling communication with the service provider unit 300, as in the step S326 of FIG. 6 (S412). After communication with the service provider unit 300 becomes available, the communication terminal 100 transmits a connection available notification to the information processing unit 200, as in the step S328 of FIG. 6 (S414). Further, the communication terminal 100 connects the terminal first communication section 102 and the terminal third communication section 106, thereby enabling indirect communication between the information processing unit 200 and the service provider unit 300.

Receiving the connection available notification transmitted in the step S414, the information processing unit 200 makes an indirect connection to the service provider unit 300 via the communication terminal 100 and accesses a Web site corresponding to the service provider unit 300, as in the step S330 of FIG. 6 (S416).

Then, the service provider unit 300, which is connected to the information processing unit 200 in the step S416, transmits download confirmation information that confirms downloading of service data (purchase item) to the information processing unit 200 via the communication terminal 100 based on the information about the selected item in the S400 transferred from the information processing unit 200 (S418).

Receiving the download confirmation information transmitted in the step S418, the information processing unit 200 transmits a download request to the service provider unit 300 via the communication terminal 100, as in the step S334 of FIG. 6 (S420).

Receiving the download request transmitted in the step S420, the service provider unit 300 transmits the service data to the information processing unit 200 via the communication terminal 100 (S422). Examples of the service data transmitted from the service provider unit 300 are a license key or an encryption key corresponding to the content data desired to be purchased by the information processing unit 200, difference data, the content data itself and so on, though not limited thereto. For example, the service provider unit 300 may additionally transmit catalog data, advertisement information, security patch and so on.

Receiving the service data transmitted in the step S422, the information processing unit 200 performs receiving processing for the received service data (S424). Examples of the receiving processing performed by the information processing unit 200 are removal of function limitation or use limitation on the content data, display of information on the display screen of the display section 212 and so on, though not limited thereto.

After the service data receiving processing is completed in the step S424, the information processing unit 200 transmits a download completion notification to the service provider unit 300 via the communication terminal 100, as in the step S340 of FIG. 6 (S426). The processing of the information processing unit 200 during the steps S416 to S426 is the service processing.

Then, the information processing unit 200 transmits a communication disconnection request for disconnecting communication with the service provider unit 300 and a communication disconnection request for disconnecting communication through the second communication channel to the communication terminal 100, as in the step S342 of FIG. 6 (S428).

Receiving the communication disconnection requests in the step S428, the communication terminal 100 disconnects communication with the service provider unit 300 (S430) and further disconnects communication through the second communication channel (S432), as in the steps S344 and S346 of FIG. 6. The service provider unit 300, which has been disconnected from the communication terminal 100 in the step S430, then performs sales completion processing as postprocessing of sales (S434).

As shown in FIG. 7, in the second example of the processing in the information processing system 1000 according to an embodiment, roughly two sequences of processing, (i) processing between the communication terminal 100 and the information processing unit 200 and (ii) processing between the information processing unit 200 and the service provider unit 300, are performed independently.

The communication terminal 100 can perform switching of communication channels with the information processing unit 200 and switching between active processing and passive processing automatically during communication with the information processing unit 200 as described earlier. Further, the information processing unit 200 can perform switching of communication channels with the communication terminal 100 and generation of a connection instruction automatically during communication with the communication terminal 100. Because the information processing system 1000 includes the communication terminal 100 and the information processing unit 200 having such functions, it is possible to make the processing sequences (i) and (ii) appear as successive processing for a user.

Therefore, a user of the information processing system 1000 can seamlessly receive the download sales service provided by the service provider unit 300 using the information processing unit 200 incapable of direct communication with the service provider unit 300.

As described in the foregoing, the information processing system 1000 according to an embodiment includes the communication terminal 100, the information processing unit 200 and the service provider unit 300 etc. The communication terminal 100 acts as a communication relay between the information processing unit 200 and the service provider unit 300 etc. and enables indirect communication between the information processing unit 200 and the service provider unit 300 etc.

The communication terminal 100 can perform switching of communication channels with the information processing unit 200 and switching between active processing and passive processing automatically during communication with the information processing unit 200 as described above. Further, the information processing unit 200 can perform switching of communication channels with the communication terminal 100 and generation of a connection instruction automatically during communication with the communication terminal 100. Because the information processing system 1000 includes the communication terminal 100 and the information processing unit 200 having such functions, it is possible to make the independent processing sequences (e.g. the processing (I) to (III) and the processing (i) and (ii)) between the units appear as successive processing for a user. Thus, even if the information processing system 1000 is applied to the service where the unit to perform processing changes as shown in the above (1) to (3), the significant decrease in user-friendless does not occur unlike the information processing system according to related art, thus improving user-friendless.

It is thereby possible to implement the information processing system 1000 in which the service provided by the service provider unit 300 etc. can be received seamlessly using the information processing unit 200 that indirectly communicates with the service provider unit 300 etc. via the communication terminal 100.

[Exemplary Applications of the Information Processing System 1000]

<A> Exemplary Applications Corresponding to the First Example of the Processing in the Information Processing System 1000

(A-1)

While traveling, a user accesses a server (one example of the service provider unit 300) and purchases a detailed travel guide using a mobile phone (one example of the communication terminal 100). Then, the user holds the mobile phone (one example of the communication terminal 100) over a car navigation unit (one example of the information processing unit 200). Data of the travel guide is thereby downloaded to the car navigation unit (one example of the information processing unit 200) from the server (one example of the service provider unit 300) via the mobile phone (one example of the communication terminal 100).

(A-2)

While going out for a drive, a user accesses a server (one example of the service provider unit 300) and purchases music data using a mobile phone (one example of the communication terminal 100). Then, the user holds the mobile phone (one example of the communication terminal 100) over a car navigation unit (one example of the information processing unit 200). The music data is thereby downloaded to the car navigation unit (one example of the information processing unit 200) from the server (one example of the service provider unit 300) via the mobile phone (one example of the communication terminal 100).

<B> Exemplary Application Corresponding to the Second Example of the Processing in the Information Processing System 1000

In a car navigation unit (one example of the information processing unit 200) where a music content protected by an encryption key is prestored, a user selects purchase of the music content at desired timing. The user then holds a mobile phone (one example of the communication terminal 100) over the car navigation unit (one example of the information processing unit 200). Key information for removal is thereby downloaded to the car navigation unit (one example of the information processing unit 200) via the mobile phone (one example of the communication terminal 100), so that the protection of the music content is removed.

<C> Other Exemplary Applications (C-1)

While going out for a drive with a friend on another car, a user displays the phone number of the friend on a mobile phone (one example of the communication terminal 100) and holds the mobile phone (one example of the communication terminal 100) over a car navigation unit (one example of the information processing unit 200). Then, the car navigation unit (one example of the information processing unit 200) makes a connection to a mobile phone of the friend via the mobile phone (one example of the communication terminal 100). The user can thereby talk with the friend hands-free.

(C-2)

A user holds a mobile coupon received at a chain store before over a car navigation unit (one example of the information processing unit 200). The car navigation unit (one example of the information processing unit 200) then makes a connection to a server (one example of the service provider unit 300) via a mobile phone (one example of the communication terminal 100). The latest map list information of the chain store corresponding to the mobile coupon is thereby downloaded to the car navigation unit (one example of the information processing unit 200) from the server (one example of the service provider unit 300) via the mobile phone (one example of the communication terminal 100).

(C-3)

While a user is driving a car, when the car comes to a road that is not registered in a car navigation unit (one example of the information processing unit 200), a message "update the map?" is displayed on a display screen of the car navigation unit (one example of the information processing unit 200). The user then holds a mobile phone (one example of the communication terminal 100) over the car navigation unit (one example of the information processing unit 200). Map information is thereby downloaded to the car navigation unit (one example of the information processing unit 200) from a server (one example of the service provider unit 300) via the mobile phone (one example of the communication terminal 100).

With the use of the information processing system 1000 according to an embodiment, the above <A> to <C> can be implemented, for example. Applications of the information processing system 1000 according to an embodiment are not limited to the above <A> to <C>.

Although the communication terminal 100 is described as an example of a component of the information processing system 1000 according to an embodiment above, the embodiment is not limited thereto. For example, an embodiment may be applied to various kinds of devices including mobile communication units such as a mobile phone and a personal handyphone system (PHS), computers such as ultra mobile personal computer (UMPC) and portable game devices such as PlayStation Portable (registered trademark).

Further, although the information processing unit 200 is described as an example of a component of the information processing system 1000 according to an embodiment above, the embodiment is not limited thereto. For example, an embodiment may be applied to various kinds of devices including computers such as PC, music playback units such as WALKMAN (registered trademark) and car navigation units.

(Programs Related to the Information Processing System 1000

[Program for the Communication Terminal 100]

With use of a program that causes a computer to function as the communication terminal 100 according to an embodiment, it is possible to implement the information processing system 1000 in which the service provided by the service provider unit 300 etc. can be received seamlessly using the information processing unit 200 that indirectly communicates with the service provider unit 300 etc. via the communication terminal 100.

[Program for the Information Processing Unit 200]

With use of a program that causes a computer to function as the information processing unit 200 according to an embodiment, it is possible to implement the information processing system 1000 in which the service provided by the service provider unit 300 etc. can be received seamlessly using the information processing unit 200 that indirectly communicates with the service provider unit 300 etc. via the communication terminal 100.

Although FIG. 1 shows the configuration where the information processing unit 200 includes both the unit first communication section 204 and the unit second communication section 206 internally, an embodiment is not limited thereto. For example, the information processing unit according to an embodiment may have the configuration where the unit first communication section 204 is installed externally, that is, it may be connected to the unit first communication section as an external unit (e.g. connected to a reader/writer). In such a configuration also, the information processing unit according to an embodiment can acquire the connection information from the communication terminal 100, thus having the same advantage as the information processing unit 200 described above.

Further, although a program (computer program) that causes a computer to function as the communication terminal 100 or the information processing unit 200 according to an embodiment may be provided as described above, a recording medium that stores the program may be further provided according to an embodiment.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:
   a first communication section configured to communicate with a communication terminal through a first communication channel; and
   a second communication section configured to communicate with the communication terminal through a second communication channel different from the first communication channel;
   wherein the first communication section is configured to receive connection information for establishing the second communication channel being transmitted from the communication terminal, and
   the second communication section is configured to establish the second communication channel based on the connection information received by the first communication channel, transmit a connection instruction by which the communication terminal connects to a service providing apparatus via a network, and receive service data transmitted by the service providing apparatus from the communication terminal.

2. The information processing apparatus according to claim 1, wherein the first communication channel is established by using a carrier at a prescribed frequency.

3. The information processing apparatus according to claim 2, wherein the prescribed frequency is 13.56 MHz.

4. The information processing apparatus according to claim 1, wherein the first communication channel is formed by NFC.

5. The information processing apparatus according to claim 1, wherein the first communication channel is formed by infrared communication.

6. The information processing apparatus according to claim 1, wherein the second communication section is configured to transmit a communication disconnection request to the communication terminal through the second communication channel and then disconnect a communication with the communication terminal through the second communication channel.

7. The information processing apparatus according to claim 6, wherein the communication terminal is configured to disconnect a communication with the service providing apparatus according to the communication disconnection request transmitted from the second communication section.

8. The information processing apparatus according to claim 1, further comprising a display section capable of displaying communication request information requesting communication through the first communication channel.

9. The information processing apparatus according to claim 8, wherein the first communication section is configured to transmit a connection information acquisition request requesting acquisition of the connection information to the communication terminal if the communication request information is displayed on the display section.

10. The information processing apparatus according to claim 9, wherein the first communication section is configured to receive the connection information from the communication terminal in response to the connection information acquisition request.

11. An information processing method comprising the steps of:
   receiving connection information, transmitted from a communication terminal through a first communication channel, for establishing a second communication channel different from the first communication channel;
   establishing the second communication channel based on the connection information received by the first communication channel;

transmitting a connection instruction by which the communication terminal connects to a service providing apparatus via a network through the second communication channel; and receiving service data transmitted by the service providing apparatus from the communication terminal through the second communication channel.

12. A communication terminal comprising:

a first communication section configured to communicate with an information processing apparatus through a first communication channel; and a second communication section configured to communicate with the information processing apparatus through a second communication channel different from the first communication channel;

wherein the first communication section is configured to transmit connection information for establishing the second communication channel to the information processing apparatus, and the second communication section is configured to establish the second communication channel based on the connection information, receive a connection instruction by which the communication terminal connects to a service providing apparatus via a network, and transmit service data transmitted by the service providing apparatus to the information processing apparatus.

13. The communication terminal according to claim 12, wherein the first communication channel is established by using a carrier at a prescribed frequency.

14. The communication terminal according to claim 13, wherein the prescribed frequency is 13.56 MHz.

15. The communication terminal according to claim 12, wherein the first communication channel is formed by NFC.

16. The communication terminal according to claim 12, wherein the first communication channel is formed by infrared communication.

17. The communication terminal according to claim 12, wherein the second communication section is configured to receive a communication disconnection request from the information processing apparatus through the second communication channel and then disconnect a communication with the information processing apparatus through the second communication channel.

18. The communication terminal according to claim 17, wherein the communication terminal is configured to disconnect a communication with the service providing apparatus according to the communication disconnection request received by the second communication section.

19. The communication terminal according to claim 12, wherein the first communication section is configured to receive a connection information acquisition request requesting acquisition of the connection information from the information processing apparatus.

20. The communication terminal according to claim 19, wherein the first communication section is configured to transmit the connection information to the information processing apparatus in response to the connection information acquisition request.

21. An communication method comprising the steps of:

transmitting connection information, to an information processing apparatus through a first communication channel, for establishing a second communication channel different from the first communication channel;

establishing the second communication channel based on the connection information;

receiving a connection instruction by which a communication terminal connects to a service providing apparatus via a network through the second communication channel; and transmitting service data received from the service providing apparatus to the information processing apparatus through the second communication channel.

* * * * *